United States Patent
Kaukovuori et al.

(10) Patent No.: US 9,325,553 B2
(45) Date of Patent: Apr. 26, 2016

(54) DIRECT CONVERSION RECEIVER CIRCUIT FOR CONCURRENT RECEPTION OF MULTIPLE CARRIERS

(71) Applicant: Broadcom Corporation, Irvine, CA (US)

(72) Inventors: Jouni Kristian Kaukovuori, Vantaa (FI); Jonne Juhani Riekki, Espoo (FI); Jari Johannes Heikkinen, Helsinki (FI); Aarno Tapio Parssinen, Espoo (FI); Pauli Mikael Seppinen, Vantaa (FI)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/421,886

(22) PCT Filed: Jun. 27, 2013

(86) PCT No.: PCT/IB2013/001363
§ 371 (c)(1),
(2) Date: Feb. 16, 2015

(87) PCT Pub. No.: WO2014/027232
PCT Pub. Date: Feb. 20, 2014

(65) Prior Publication Data
US 2015/0236887 A1      Aug. 20, 2015

(30) Foreign Application Priority Data
Aug. 15, 2012   (GB) .................................. 1214562.9

(51) Int. Cl.
H04B 1/00          (2006.01)
H04L 27/26         (2006.01)
(Continued)

(52) U.S. Cl.
CPC .............. *H04L 27/2647* (2013.01); *H04B 7/12* (2013.01); *H04J 11/0063* (2013.01)

(58) Field of Classification Search
CPC .... H04L 27/2647; H04L 1/20; H04B 1/1027; H04B 1/123; H04B 1/1036
USPC .................................. 375/259–285, 316–352
See application file for complete search history.

(56) References Cited

U.S. PATENT DOCUMENTS 6,970,681 B2 *  11/2005  Darabi ................... H04B 1/406
                                                              370/328
8,254,306 B2 *  8/2012   Kent ..................... H04B 7/0697
                                                              370/328

(Continued)

OTHER PUBLICATIONS

Office Action for Chinese Patent Application No. 2013800537161, mailed Dec. 17, 2015 (including English summary).

*Primary Examiner* — James M Perez
(74) *Attorney, Agent, or Firm* — Foley & Lardner LLP; Christopher J. McKenna; Paul M. H. Pua

(57) ABSTRACT

A receiver circuit comprising a connection portion for guiding each one of a first predefined number of carrier signals of multiple carriers to one of a number of receive branches, each receive branch comprising at least one amplifier load structure, the number of receive branches being equal to the first predefined number. The receiver circuit also comprises a mixing portion for generating a second predefined number of mixed carrier signals on each receive branch by mixing a carrier signal on each one of the receive branches with a number of local oscillator frequencies equal to the second predefined number, and a selection portion for selecting one of the second predefined number of mixed carrier signals on each receive branch to be output via a number of output paths equal to the first predetermined number to a digital data path.

20 Claims, 17 Drawing Sheets

(51) Int. Cl.
  *H04B 7/12*    (2006.01)
  *H04J 11/00*   (2006.01)

(56) References Cited

U.S. PATENT DOCUMENTS

| | | | | |
|---|---|---|---|---|
| 8,335,279 | B2 * | 12/2012 | Cowley | H04B 17/11 375/316 |
| 8,428,650 | B2 * | 4/2013 | Pottenger | H04B 1/0003 375/219 |
| 2010/0151900 | A1 * | 6/2010 | Koli | G11C 27/024 455/550.1 |
| 2010/0158172 | A1 * | 6/2010 | Kim | H04B 1/30 375/346 |
| 2011/0019723 | A1 * | 1/2011 | Lerner | H04B 7/0871 375/219 |
| 2011/0190029 | A1 * | 8/2011 | Parssinen | H04B 1/0028 455/552.1 |

* cited by examiner

DIRECT CONVERSION RECEIVER CIRCUIT FOR CONCURRENT RECEPTION OF MULTIPLE CARRIERS

RELATED APPLICATIONS

This application is the U.S. National Stage of International Application Number PCT/IB2013/001363 filed Jun. 27, 2013, which claims priority to and the benefit of GB applications number 1214562.9 filed Aug. 15, 2012. The entire contents of the foregoing applications are hereby incorporated herein by reference in their entireties for all purposes.

TECHNICAL FIELD

The present invention relates to a receiver circuit and a receiver using the same. In particular, but not exclusively, the present invention relates to structural and functional features of a receiver circuit for concurrent reception of multiple carriers and a receiver using the same.

BACKGROUND

In recent and future radio systems, there is generally an increasing need to exploit the radio spectrum as effectively as possible. In recent and future radio communication systems, there is also an increasing need to enable higher data rates. In view thereof, multi-carrier radio systems, especially multi-band multi-carrier radio systems, are being developed in order to cope with such needs.

FIG. 1 shows a graph illustrating a multi-band multi-carrier scenario, for which embodiments of the present invention are applicable. As shown in FIG. 1, multiple carriers from different frequency bands may be used for radio transmission purposes in a combined or aggregated manner.

For example, such a multi-band multi-carrier scenario approach is currently used in dual-band dual-carrier (DB-DC) or dual-band four-carrier (DB-4C) HSDPA and LTE inter-band carrier aggregation (CA). In 3GPP specifications, certain band configurations are specified in this regard. For example, band combinations I+VIII, II+IV, I+V, I+XI, and II+V are currently specified for DB-DC HSDPA and DB-4C HSDPA, while roughly 20 inter-band combinations (e.g. bands 4+13, 20+7, 2+17, 3+20, 2+MediaFlo, 4+MediaFlo, 1+18, 1+19, 4+17, 4+12, 3+7, 5+12, 5+17, 1+7, 4+7, 5+MediaFlo, 4+5, 3+5, 8+20, 11+18, 1+21) are currently specified (and dedicated for specific operators) for inter-band CA.

Currently, a single direct-conversion receiver is typically utilized in terminals of recent radio (communication) systems. Examples for the utilization of DCR-type receivers in cellular systems involve UEs in GSM, WCDMA, HSPA, and single-carrier LTE modes (Rel-7/8/9).

FIG. 2 shows a schematic block diagram of a topology of a conventional direct-conversion receiver (DCR).

As evident From FIG. 2, a received radio signal is preselected by a pre-select (band-pass) filter, and the thus preselected radio signal is amplified in a low-noise amplifier (LNA) before being down-converted, e.g. to zero intermediate frequency (IF) for single-carrier reception and to low intermediate frequency (IF) for dual-carrier reception. For phase- and frequency-modulated signals, the down-conversion is to be performed with down-conversion mixers (MIX) controlled by a quadrature local oscillator (LO) signal to prevent signal sidebands from aliasing on one another. In each quadrature receive path, prior to analog-to-digital conversion by an analog-to-digital converter (ADC), the signal is low-pass filtered by a low-pass filter (LPF) and amplified by an amplifier (AMP) such that the signal level for the ADC is at a sufficient level.

The basic problem with a single-RX-chain topology of a DCR-type receiver, as shown in FIG. 2, is that it is not able to (concurrently) receive radio signals of a multi-band multi-carrier scenario such as an RF allocation shown in FIG. 1. The reception of two (or, possibly even more) non-contiguous component carriers causes several design challenges for a receiver containing one RX chain only.

However, from an integrated circuit development point of view, DCR-type receivers have several advantages compared to other receiver types, such as low complexity and power consumption, small silicon area, and a low number of off-chip components. Further, utilization of DCR-type receivers for terminals of recent and future radio systems is also beneficial in terms of backward compatibility and multi-mode operability. For example, this is evident when considering that e.g. a Rel-10 NC-HSDPA (or non-contiguous LTE) capable UE may also be configured for lower data rates and single-carrier operation, and user expectations would be for similar or better battery life than legacy UEs when operating at lower data rates (i.e. in non-carrier aggregation mode).

Accordingly, it is desirable and also to be expected that DCR-type receivers are also utilized for multi-band multi-carrier scenarios, such as e.g. with DB-DC/DB-4C HSDPA and/or multi-carrier LTE modes (Rel-10 and beyond). Yet, such receivers would need to be able to (concurrently) receive inter-band non-contiguous carriers.

The aforementioned problem could be addressed by handling multiple carriers of multiple frequency bands in separate RX chains of DCR type, both having a LO signal of its own. This is depicted in FIG. 3, where a multi-band multi-carrier scenario with two separate local oscillator frequencies is illustrated, for which embodiments of the present invention are applicable.

Possible solutions for a receiver, which is able to handle a dual-band dual-carrier reception concurrently, could be based on two separate single-carrier RX chains of DCR-type.

FIG. 4 shows a schematic block diagram of a first topology of a receiver with separate receive paths of conventional direct-conversion receivers, wherein two separate RFICs are utilized. FIG. 5 shows a schematic diagram of a second topology of a receiver with separate receive paths of conventional direct-conversion receivers, wherein a single RFIC is utilized.

In the topology according to FIG. 4, there is a disadvantage that the cost of the platform clearly increases, since two separate RFICs with additional power management circuits, crystal oscillators, input matching components, decoupling components etc. are needed. In addition to an additional RX chain, there would also be lots of redundant hardware added with the drawback of increased PWB area. Thus, this would be an undue and expensive solution to realize a concurrent dual-band receiver.

In the topology according to FIG. 5, the number of RX chains is doubled in a single RFIC. Typically, the number of LNA inputs in a single RFIC is high—normally 6-10 per RX chain (i.e. 12-20 in total when main and diversity receptions are calculated together in a diversity receiver). The placing of LNA inputs on the RFIC die is already challenging and routing to package pins requires a number of trade-offs to be solved, thus degrading the LNA performance. In addition, depending on the number of RFIC inputs, the count of the external matching components can become high, thus being an expensive solution. Thus, this would be an undue and expensive solution to realize a concurrent dual-band receiver.

FIG. 6 shows a schematic block diagram of a topology of a multi-input configurable receiver based on a conventional direct-conversion receiver.

The topology shown in FIG. 6 represents a simplified topology of a hardware/performance-optimized DCR-type receiver which is able to support multiple carriers on multiple bands. To this end, there are n LNA input stages dedicated to support low-bands (LB), illustrated by a dash-dotted block and denoted as $LNA_{LB}$, and m LNA input stages dedicated to support high-bands (HB), illustrated by a dash-dotted block and denoted as $LNA_{HB}$. The carrier signal from an active input is guided to a corresponding load ($Z_{L,LB}$ for low-bands or $Z_{L,HB}$ for high-bands). $Z_M$ represents an interface between LNA and mixer portions. The interface $Z_M$ can consist of a passive network and separate transconductance ($g_m$) stages, implementing several gain steps, and/or have separate signal paths for I and Q branches, etc. Low-band and high-band LNA loads ($Z_{L,LB}$, $Z_{L,HB}$) are typically followed by separate mixer cores. This leads to sufficient overall performance and minor layout area increase, since mixer cores occupy only a fairly small die area and the LNA-mixer interface is critical for receiver performance. Therefore, LB/HB signal paths are typically combined after down-conversion to intermediate frequency in the mixer stage.

However, the receiver according to FIG. 6 exhibits multiple RX chains on the input side only, whilst these converge (by virtue of the switches after the mixer stage) to a single RX chain on the output side. Thus, this receiver topology is also not capable of concurrently receiving and outputting to the digital data path carrier signals of multiple carriers.

Accordingly, there is currently no viable solution to the aforementioned problems.

Thus, there is a desire to provide a receiver circuit for concurrent reception of multiple carriers and a receiver using the same, which are capable of (concurrently) receiving multiple carriers in a multi-band multi-carrier scenario on the basis of a DCR-type topology.

SUMMARY

Various embodiments of the present invention aim at addressing at least part of the above issues and/or problems and drawbacks. Various aspects of embodiments of the present invention are set out in the appended claims.

According to a first aspect of the present invention, there is provided a receiver circuit for use at a terminal in a communication system, the receiver circuit comprising:

an input portion arranged to input a plurality of carrier signals of multiple carriers via a plurality of amplifier input stages;

a connection portion arranged to guide each one of a first predefined number of carrier signals in said plurality to one of a number of receive branches, each receive branch comprising at least one amplifier load structure, said number of receive branches being equal to said first predefined number;

a mixing portion arranged to generate a second predefined number of mixed carrier signals on each receive branch by mixing a carrier signal on each one of said receive branches with a number of local oscillator frequencies equal to the second predefined number;

a selection portion arranged to select one of the second predefined number of mixed carrier signals on each receive branch; and an output portion arranged to output a number of the selected mixed carrier signals on the receive branches via a number of output paths to a digital data path, said number of selected mixed carried signals being equal to said first predetermined number, said number of output paths being equal to said first predetermined number.

According to a second aspect of the present invention, there is provided a receiver for use at a terminal in a communication system, comprising at least one receiver circuit according to the first aspect of the present invention.

According to a third aspect of the present invention, there is provided a method of operating a receiver circuit at a terminal in a communication system, the method comprising:

inputting a plurality of carrier signals of multiple carriers via a plurality of amplifier input stages;

guiding each one of a first predefined number of carrier signals in said plurality to one of a number of receive branches, each receive branch comprising at least one amplifier load structure, said number of receive branches being equal to said first predefined number;

generating a second predefined number of mixed carrier signals on each receive branch by mixing a carrier signal on each one of said receive branches with a number of local oscillator frequencies equal to the second predefined number;

selecting one of the second predefined number of mixed carrier signals on each receive branch; and outputting a number of the selected mixed carrier signals on the receive branches via a number of output paths to a digital data path, said number of selected mixed carried signals being equal to said first predetermined number, said number of output paths being equal to said first predetermined number.

Embodiments comprise a computer program product comprising a non-transitory computer-readable storage medium having computer readable instructions stored thereon, the computer readable instructions being executable by a computerized device to cause the computerized device to perform a method according to the third aspect of the present invention.

Advantageous further developments or modifications of the aforementioned aspects of the present invention are set out below.

By virtue of any one of the aforementioned aspects of the present invention, there are provided a receiver circuit for concurrent reception of multiple carriers and a receiver using the same, which are capable of (concurrently) receiving multiple carriers in a multi-band multi-carrier scenario on the basis of a DCR-type topology.

Thus, by way of embodiments of the present invention, enhancements and/or improvements are achieved by structural and functional features of a receiver circuit for concurrent reception of multiple carriers and a receiver using the same.

Further features and advantages of the invention will become apparent from the following description of preferred embodiments of the invention, given by way of example only, which is made with reference to the accompanying drawings.

BRIEF DESCRIPTION OF DRAWINGS

For a more complete understanding of embodiments of the present invention, reference is now made to the following description taken in connection with the accompanying drawings in which.

DETAILED DESCRIPTION

Aspects of the present invention will be described herein below. More specifically, aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to explanations being used as non-limiting examples for exemplifying purposes. As such, the description of embodiments given herein specifically refers to terminology which is related thereto. Such terminology is only used in the context of the presented non-limiting examples, and naturally does not limit the invention in any way.

In particular, the present invention and its embodiments may be applicable to any multi-band single- or multi-carrier transmission scenario, for which a concurrent reception of multiple carriers is desirable. Such application areas may for example involve any radio systems, radio communication systems as well as radar and satellite systems. For examples, the present invention and its embodiments may be applicable to operate with 3GPP cellular systems, e.g. dual-band HSDPA or LTE CA configuration, as well as other radio systems, such as positioning systems (e.g. GPS, GLONASS, Galileo, etc.), or connectivity radio systems, such as WLAN and/or Bluetooth. Moreover, the present invention and its embodiments may be applicable to (support of) inter-RAT operation, e.g. (carriers of) cellular radio links such as LTE and connectivity radio links such as WLAN could be handled simultaneously.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to embodiments of the present invention, in general terms, there are provided measures for a steerable antenna arrangement and control thereof.

Figure 7:
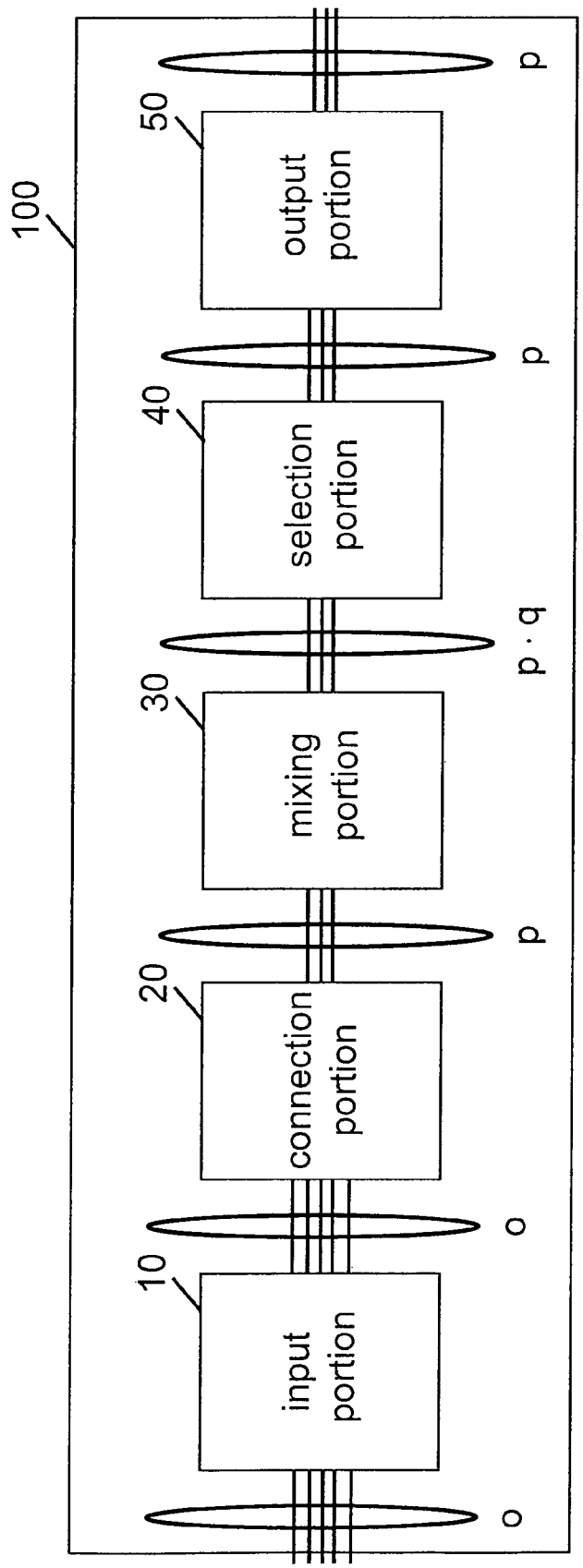
FIG. 7 shows a block diagram of a receiver circuit according to embodiments of the present invention.

FIG. 7 shows a block diagram of a receiver circuit according to embodiments of the present invention.

As shown in FIG. 7, a receiver circuit 100 according to embodiments of the present invention comprises an input portion 10, a connection portion 20, a mixing portion 30, a selection portion 40 and an output portion 50. The letters below the ellipses around the lines between the individual portions indicate the number of signal lines or connections, respectively.

The input portion 10 is operable to input a plurality of carrier signals of multiple carriers via a plurality of amplifier input stages. In the illustrated example, a number of carriers equal to o are input via the input portion 10.

The connection portion 20 is operable to guide each one of a first predefined number of said carrier signals to one of the first predefined number of receive branches, each receive branch comprising a least one amplifier load structure. In the illustrated example, the first predefined number is p such that p out of the o carriers are guided to a number of p receive branches.

The mixing portion 30 is operable to generate a second predefined number of mixed carrier signals on each receive branch by mixing a carrier signal on each one of said receive branches with a second predefined number of local oscillator frequencies. In the illustrated example, the second predefined number is q such that p·q mixed carrier signals are generated, namely a number q of mixed carrier signals for each one of the p receive branches.

The selection portion 40 is operable to select one of the second predefined number of mixed carrier signals on each receive branch. In the illustrated example, one out of q mixed carrier signals is selected for each of the p receive branches such that a total of p mixed carrier signals, one for each receive branch, is selected.

The output portion 50 is operable to output the first predetermined number of the selected mixed carrier signals on the receive branches via the first predetermined number of output paths to a digital data path. In the illustrated example, as the first predefined number is p, a total number of p mixed carrier signals is output via the output portion 50 to at least one digital data path.

Although not shown in FIG. 7, a receiver circuit 100 according to embodiments of the present invention may also comprise a controller portion (which may for example comprise a processor, a memory and an interface to respective portions of the receiver circuit) which is operable to control at least one of the connection portion and the selection portion. Thereby, the controller portion may determine a receiver chain from the input portion to the output portion, which may for example be accomplished on the basis of at least one of received signal strength of carrier signals of multiple carriers, activity of a transmitter circuit, and interference properties of the multiple carriers. Details in this regard are outlined below.

According to embodiments of the present invention, the receiver circuit 100 may be embodied in a radio frequency integrated circuit (RFIC) and/or on a single die (wherein a controller may be embodied in the same RFIC and/or die, or may be embodied outside thereof or generally in a separate manner). Also, the receiver circuit 100 may constitute a receiver of DCR-type.

Figure 8:
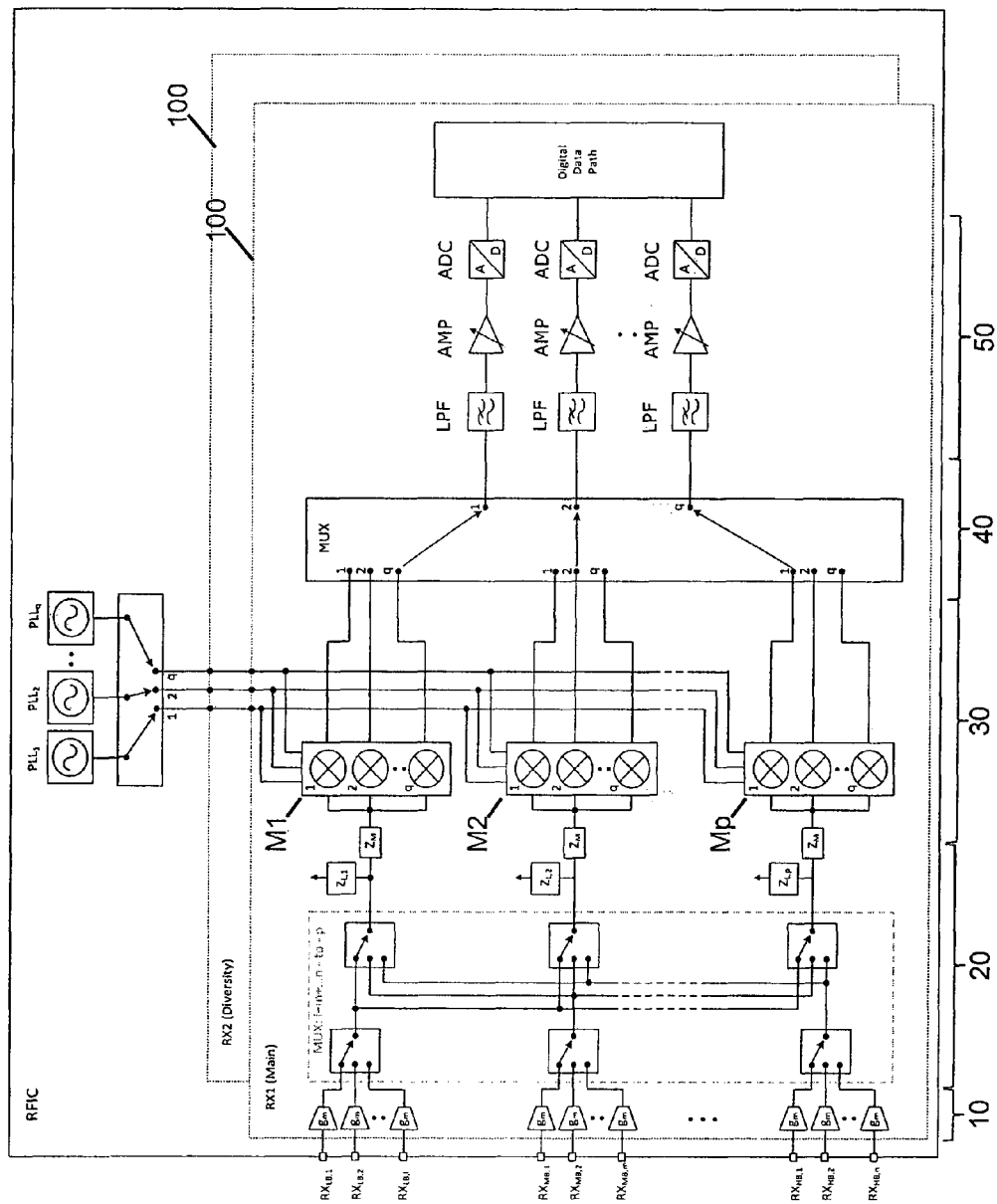
FIG. 8 shows a schematic block diagram of a topology of a receiver with a receiver circuit for concurrent reception of multiple carriers according to embodiments of the present invention.

FIG. 8 shows a schematic block diagram of a topology of a receiver with a receiver circuit for concurrent reception of multiple carriers according to embodiments of the present invention.

In the example according to FIG. 8, the receiver circuit according to embodiments of the present invention is applied to a diversity receiver. Namely, two receiver circuits are embodied in an RFIC, wherein one receiver circuit constitutes a main receiver part RX1 and one receiver circuit constitutes a diversity receiver part RX2. Such a diversity receiver can be used as a sensitivity boosting receiver when only one DL layer is being received or as a part of a MIMO receiver when at least two DL layers are being received.

It is noted that such application to a diversity receiver is only illustrated as a non-limiting example, and the receiver circuit according to embodiments of the present invention (such as the one of RX1 detailed below) is equally applicable alone in a receiver configuration. Stated in other words, a receiver according to embodiments of the present invention comprises at least one receiver circuit according to embodiments of the present invention.

It is noted that at least one receiver circuit and/or at least one receiver according to embodiments of the present invention can be implementable and/or implemented in any apparatus/device operable in a radio system with a single- or multi-carrier transmission scenario, for which a concurrent reception of multiple carriers is desirable. Accordingly, the receiver circuit and/or the receiver according to embodiments of the present invention are for use in/at/by such device or apparatus, embodiments of the present invention also cover such device or apparatus, e.g. a terminal, user equipment, or the like.

Figure 1:
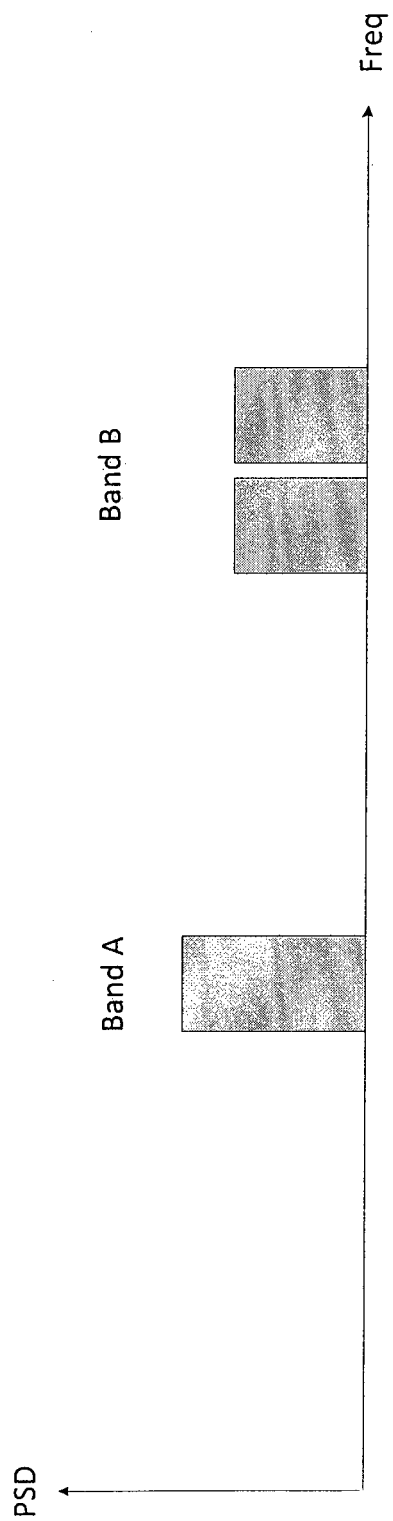
FIG. 1 shows a graph illustrating a multi-band multi-carrier scenario, for which embodiments of the present invention are applicable.
Figure 2:
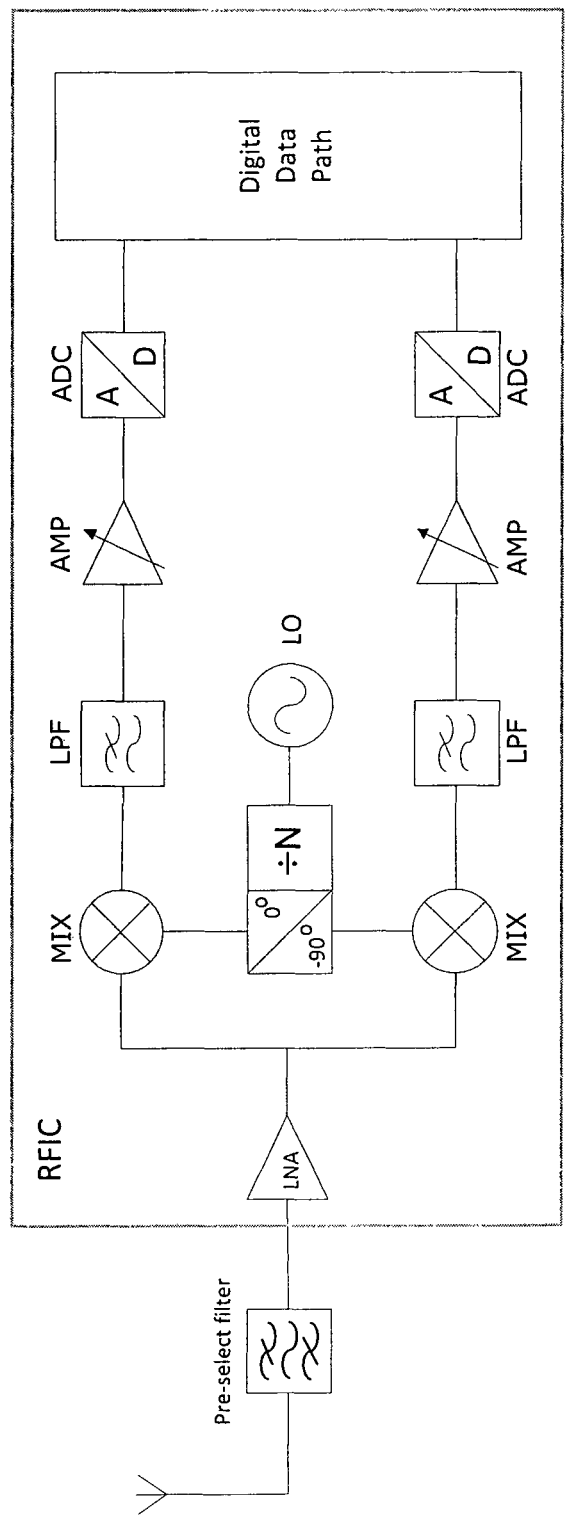
FIG. 2 shows a schematic block diagram of a topology of a conventional direct-conversion receiver.
Figure 3:
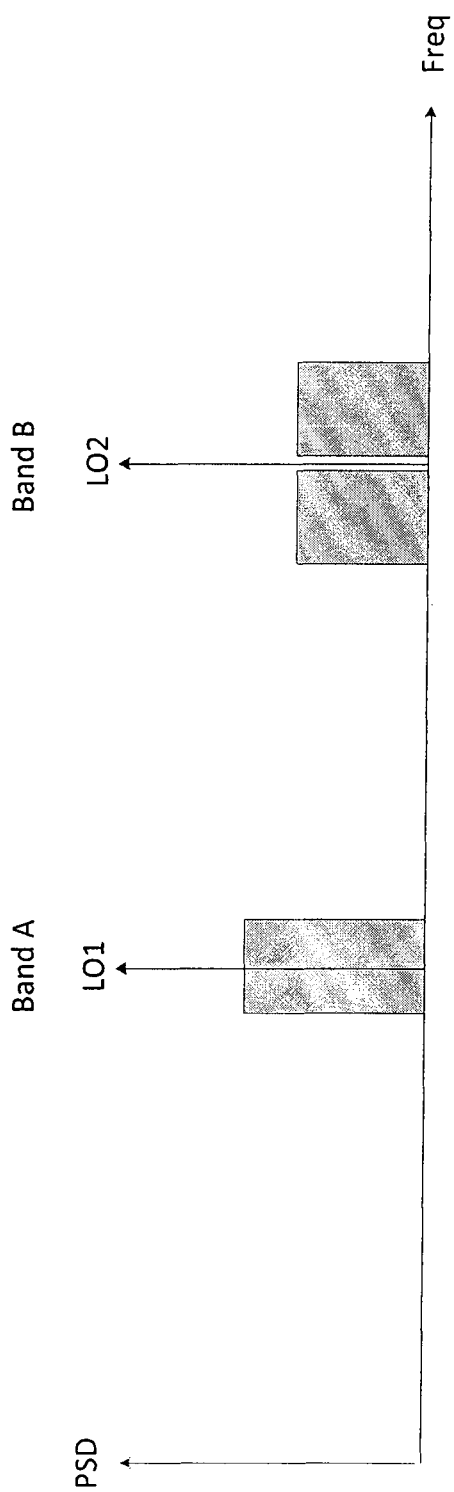
FIG. 3 shows a graph illustrating a multi-band multi-carrier scenario with two separate local oscillator frequencies, for which embodiments of the present invention are applicable.
Figure 4:
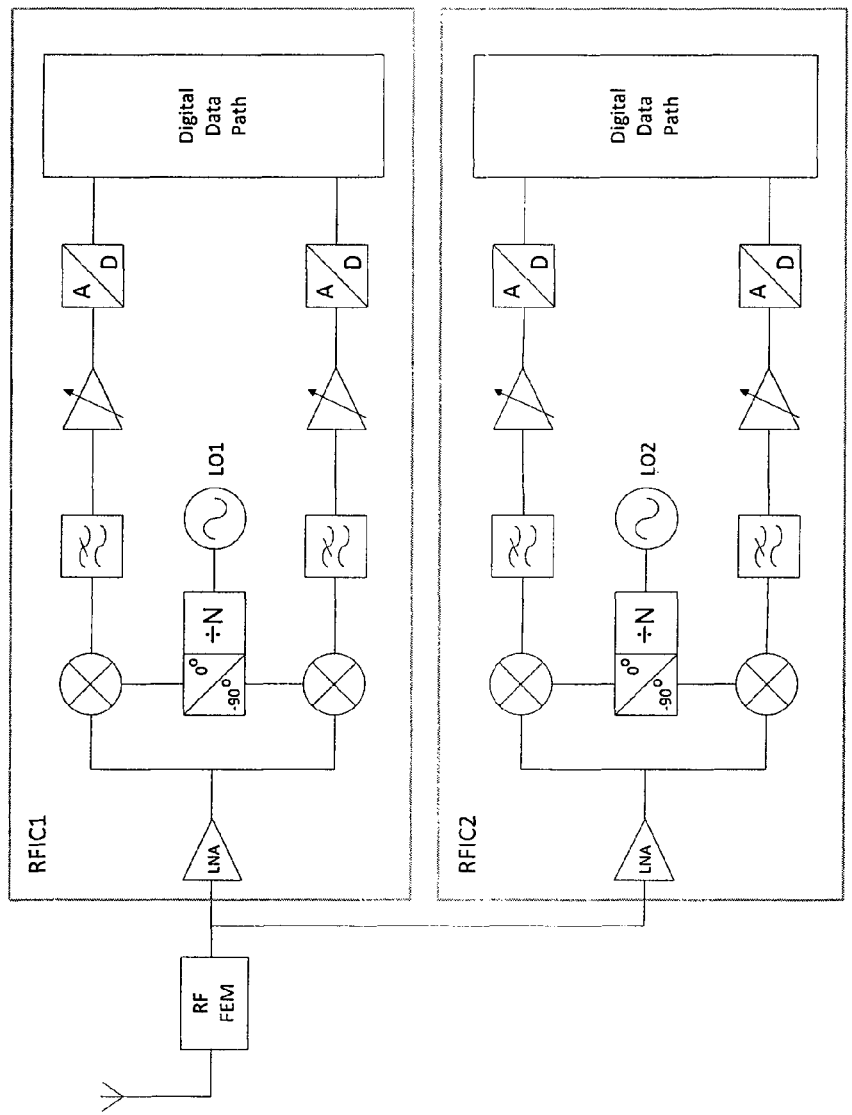
FIG. 4 shows a schematic block diagram of a first topology of a receiver with separate receive paths of conventional direct-conversion receivers using two separate RFICs.
Figure 5:
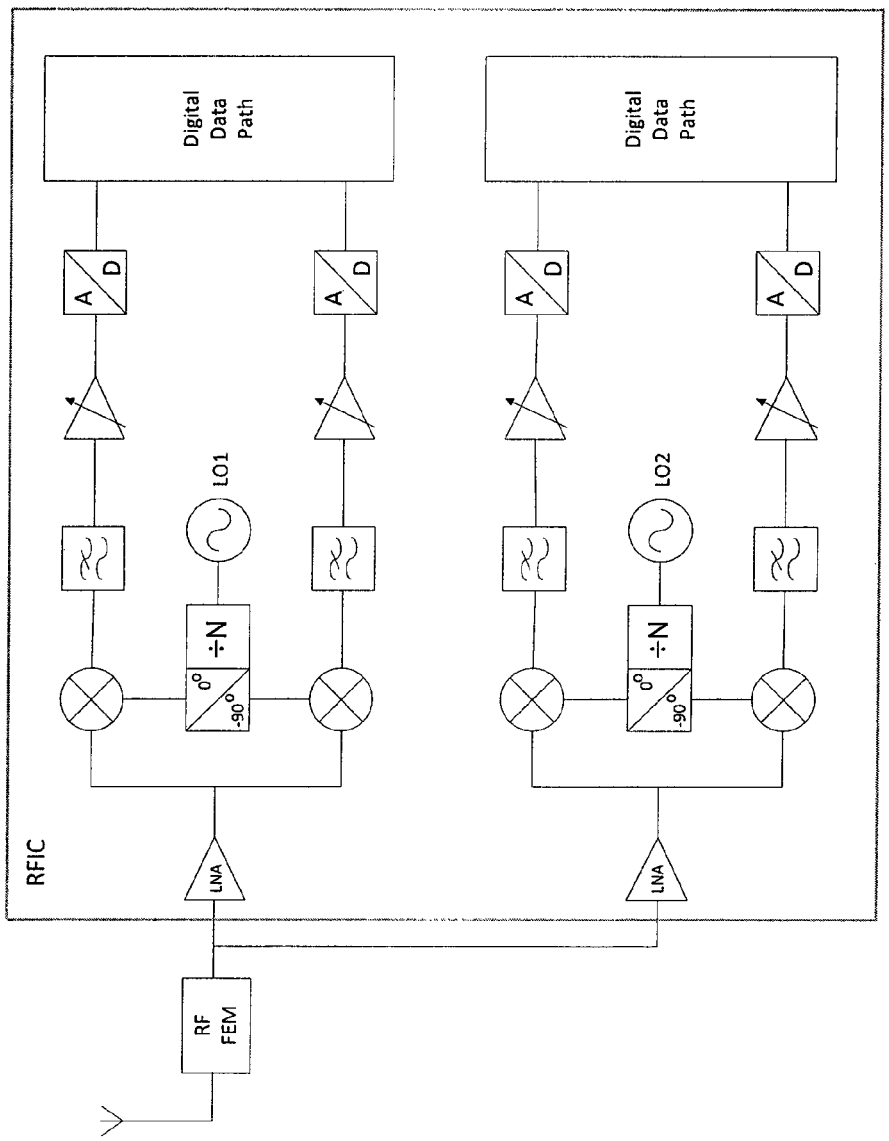
FIG. 5 shows a schematic block diagram of a second topology of a receiver with separate receive paths of conventional direct-conversion receivers using a single RFIC.
Figure 6:
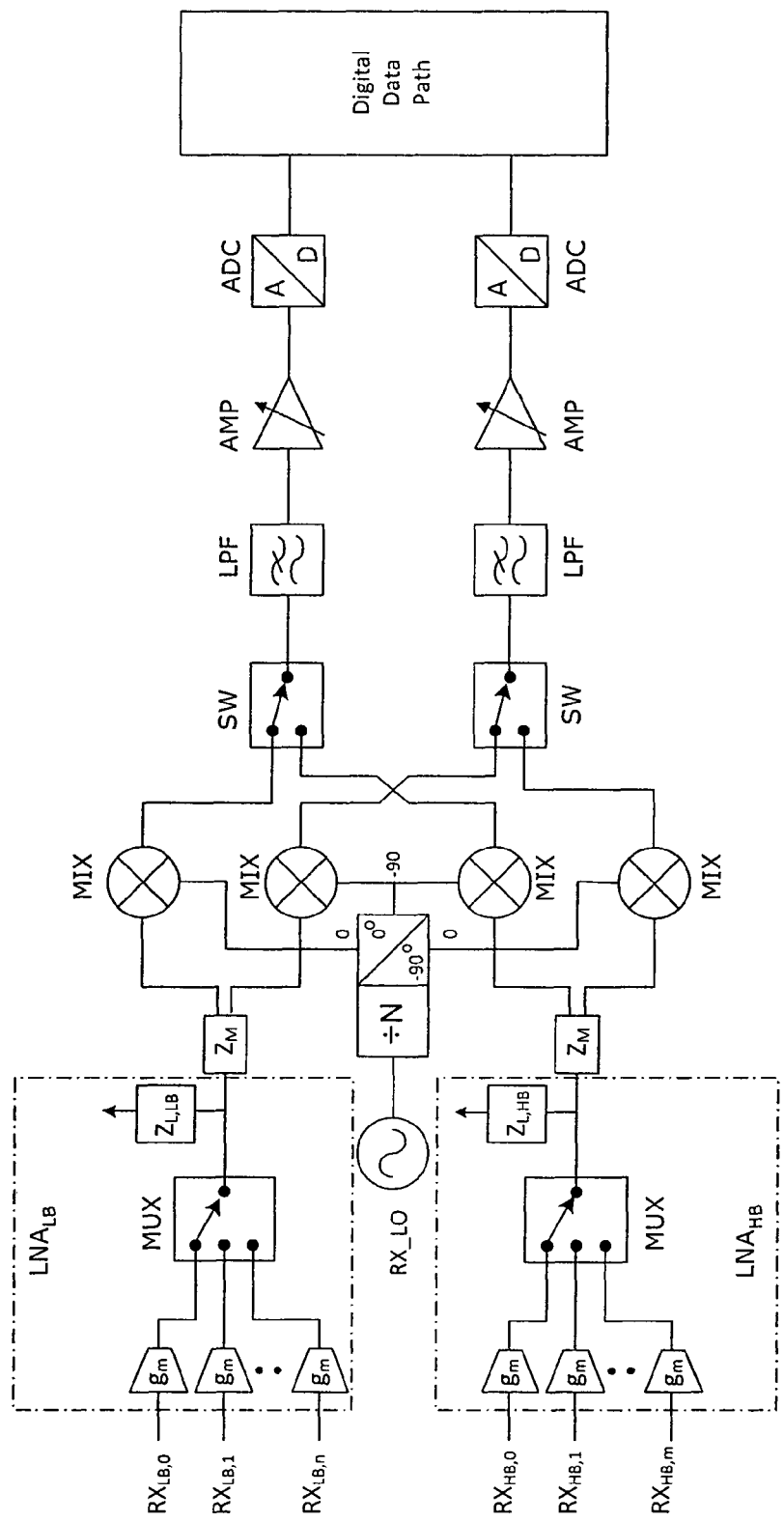
FIG. 6 shows a schematic block diagram of a topology of a multi-input configurable receiver based on a conventional direct-conversion receiver.

It is to be noted that the signal'chains are illustrated as single-line/ended chains for the sake of clarity. However, this is only a matter of illustration, and such signal chains may be realized as single, differential and quadrature chains in equal measure. Accordingly, a single-line/ended signal chain in FIG. 8 (especially after the mixing stage) corresponds to a quadrature (I and Q) signal chain in any one of FIGS. 6, 9 to 11, 13, and 14. For example, an output path comprising LPF, AMP and ADC in FIG. 8 corresponds to a pair of output paths respectively comprising LPF, AMP and ADC in FIG. 6.

In the example according to FIG. 8, the input portion 10 comprises a first predefined number of input groups, each input group comprising one or more amplifier input stages ($g_m$) which are operable to input the carrier signals of a specific carrier, respectively. Namely, a total of l+m+ ... +n $g_m$-stages (LNA inputs) are present (i.e. l+m+n=o), such that l, m, ... and n inputs are exemplarily dedicated to operate in low-band, mid-band and high-band frequency bands, respectively. The thus illustrated input grouping is shown as a non-limiting example only, while a larger number of non-dedicated inputs would also be possible so as to achieve the same functionality.

In the example according to FIG. 8, the connection portion 20 comprises a multiplexer operable to electrically connect each one of the first predefined number of said amplifier input stages, i.e. the l+m++n $g_m$-stages (LNA inputs), with any one of the first predefined number of receive branches. Thereby, the number of interconnections between the $g_m$-stages and the loads is kept at a minimum. Namely, a (l+m++n)-top multiplexer is present, and in each of the p receive branches an LNA load structure ($Z_{L,1}, Z_{L,2}, \ldots, Z_{L,p}$) is present. Accordingly, p separate LNA load structures and p separate LNA-mixer interfaces ($Z_M$) are present in the p receive branches, one in each receive branch, respectively. Furthermore, although not shown in FIG. 8, the LNA loads from the illustrated diversity receiver part could be connected to corresponding mixer banks of the main receiver part, and vice versa, respectively.

In the example according to FIG. 8, the mixing portion 30 comprises the first predefined number of mixer banks (M1, M2, . . . , Mp), each mixer bank comprising a second predefined number of mixers, and the second predefined number of local oscillators ($PLL_1, PLL_2, \ldots, PLL_q$). Namely, p mixer banks with q mixers (mixer cores) each as well as q local oscillators (i.e. LO signal generators) are present. Each mixer is operable to mix a carrier signal with one of the second predefined number (q) of local oscillator frequencies, and each local oscillator is operable to generate one of the second predefined number of local oscillator frequencies, wherein each local oscillator is connected or connectable with one of the mixers in each of said mixer banks. Accordingly, each one of the q local oscillator frequencies is supplied (via q LO interconnections) to each one of the p mixer banks, i.e. one mixer in each one of the p mixer banks, respectively. As indicated, the local oscillators could be realized by phase-locked loops, respectively. Therefore, any of the mixers can be driven by its own LO frequency.

In the example according to FIG. 8, the selection portion 40 comprises a multiplexer which is operable to electrically connect one of the mixers in each of said mixer banks with one of the first predefined number of said output paths, i.e. IF paths comprising LPF, AMP and ADC, respectively. Namely, any of the q mixer outputs for each one of the p receive branches can be connected to any one of the q IF-paths consisting of analog filters, gain adjustment, analog-to-digital conversion, etc. According to embodiments of the present invention, the digital data path may be connected to the output portion or may be part of the output portion.

According to embodiments of the present invention, there is provided a receiver circuit, i.e. a RX topology/architecture, for concurrent reception of multiple carriers. The presented RX topology/architecture is flexible with a low amount of extra hardware being required and can be configured to support various single- and/or multi-carrier scenarios.

On the one hand, the presented RX topology/architecture comprises a flexible connection portion such as an LNA load structure, where any of the amplifier load structures of a receive branch (such as e.g. wide-tuning-range narrow-band adjustable loads, as explained below) can be connected over a matrix field in an adaptive manner to any of the input LNAs (gain stages), thus allowing greatest flexibility for the frequency selection. Namely, any one of the multiple carrier signals of the multiple carriers can be guided to any one of the receive branches (and the corresponding loads). Thereby, it is enabled that the input LNAs (gain stages) can be utilized as efficiently as possible in that they can be flexibly re-used for various carriers. Accordingly, even for flexible multi-carrier operability, there is no need to add extra LNA stages, thus saving hardware requirements.

On the other hand, the presented RX topology/architecture comprises a flexible mixing portion such as a configuration of multiple mixer banks and local oscillators, thus allowing use of any of multiple LO frequencies for mixing at any of the receive branches. Namely, any receive branch may be flexibly adapted to an arbitrary carrier (as guided thereto by the connection portion). Such a mixing portion provides for configurability to any reception scenario and/or frequency range, e.g. from GSM to MIMO.

Thereby, the RX topology/architecture according to embodiments of the present invention may provide for a total of p full receiver branches or chains, which are operable in a highly flexible manner, when being adapted for the concurrent receipt of p carriers. These structures and functions allow any of the receive branches or chains to be used for any carrier or frequency (band), thus making the RX topology/architecture according to embodiments of the present invention extremely flexible without the need to have many duplicate receiver paths or other duplicate hardware.

In the following, various receiver circuit topologies according to embodiments of the present invention are described, which are adapted for a concurrent reception of two carriers or frequencies (i.e. frequency bands). Whilst the following description thus specifically relates to hardware solutions for a concurrent dual-carrier receiver, the principles explained in such non-limiting examples are equally applicable to the concurrent reception of any number of carriers. That is to say, the description below relating to dual-carrier reception is made without restriction to the generality of the thus taught principles as well as structural and functional features.

The receiver circuit topologies according to embodiments of the present invention, as described hereinafter, specifically relate to solutions for a concurrent dual-carrier receiver with minimal layout and power consumption impact compared to legacy direct-conversion receiver. In addition, potential solutions to efficiently process different dual carrier HSDPA or LTE CA cases with two RX chains are discussed.

Figure 9:
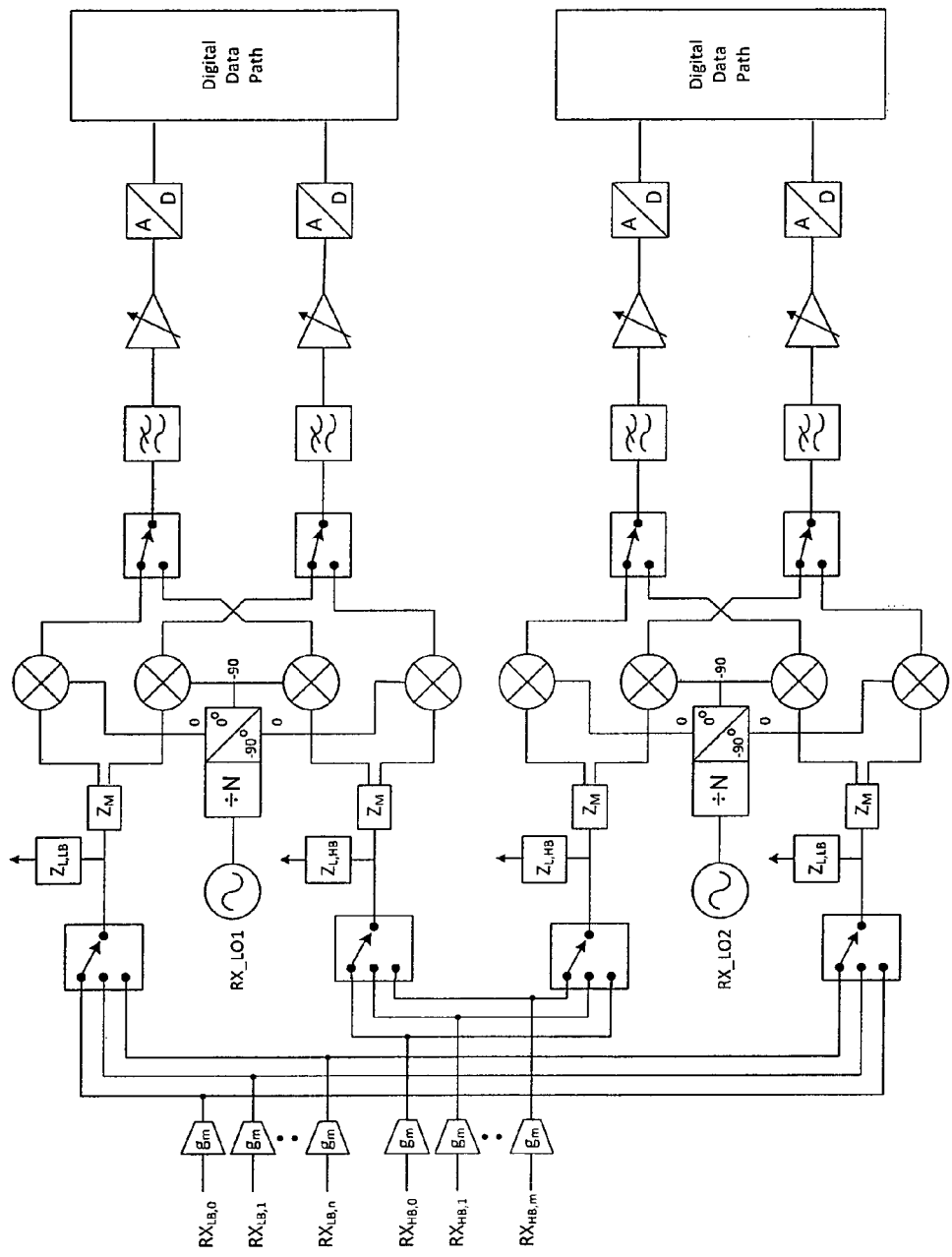
FIG. 9 shows a schematic block diagram of a first topology of a receiver with a receiver circuit for concurrent dual-carrier reception according to embodiments of the present invention.

FIG. 9 shows a schematic block diagram of a first topology of a receiver with a receiver circuit for concurrent dual-carrier reception according to embodiments of the present invention.

As shown in FIG. 9, there are n and m LNA input stages which are dedicated to support (carriers of) low-bands (LB) and (carriers of) high-bands (HB), respectively. n LB LNA input stages and m HB LNA input stages are connected to respective inputs. Two full RX chains are present. Namely, in addition to the receiver hardware as presented in FIG. 6, additional LNA loads ($Z_{L,HB}$, $Z_{L,LB}$), additional signal paths and an additional LO signal generator (RX_LO2) are added (in the lower part of FIG. 9). Meanwhile, the LNA input stages are shared between different RX chains, i.e. the number of LNA input stages is not increased compared to a legacy 2G/3G/LTE-device.

Accordingly, the connection portion is operable to guide a carrier signal of one carrier and a carrier signal of another carrier to one receive branch, and to guide another carrier signal of the one carrier and another carrier signal of the another carrier to another receive branch, the mixing portion comprises a local oscillator for each of the receive branches, and each receive branch comprises a low-band amplifier load structure for low-band carriers and a high-band amplifier load structure for high-band carriers.

Figure 10:
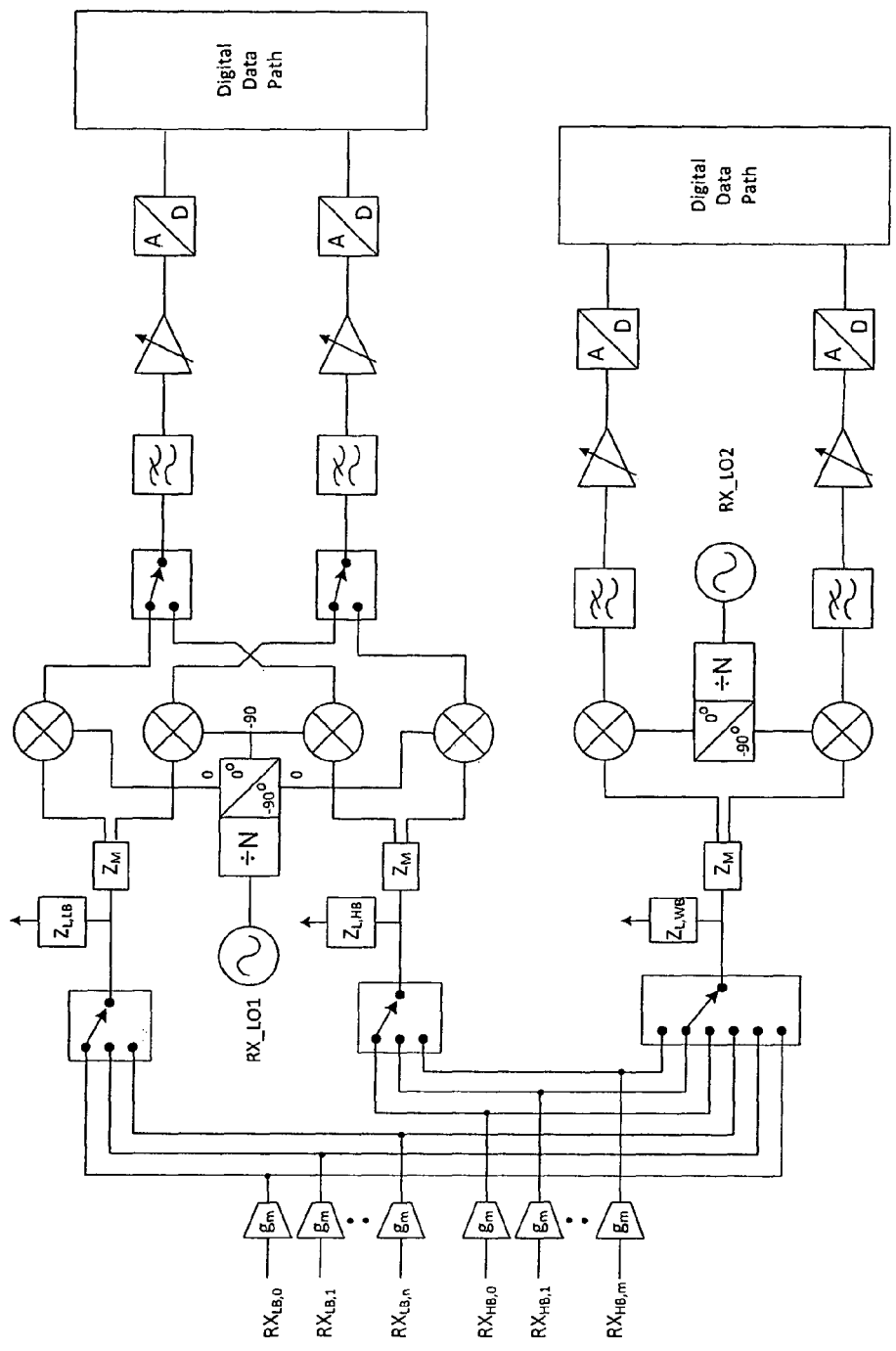
FIG. 10 shows a schematic block diagram of a second topology of a receiver with a receiver circuit for concurrent dual-carrier reception according to embodiments of the present invention.

FIG. 10 shows a schematic block diagram of a second topology of a receiver with a receiver circuit for concurrent dual-carrier reception according to embodiments of the present invention.

As shown in FIG. 10, there are n and m LNA input stages which are dedicated to support (carriers of) low-bands (LB) and (carriers of) high-bands (HB), respectively. n LB LNA input stages and m HB LNA input stages are connected to respective inputs. Two full RX chains are present. Namely, in addition to the receiver hardware as presented in FIG. 6, an additional wide-band LNA load ($Z_{L,WB}$), additional signal paths and an additional LO signal generator (RX_LO2) are added (in the lower part of FIG. 10). Meanwhile, the LNA input stages are shared between different RX chains, i.e. the number of LNA input stages is not increased compared to a legacy 2G/3G/LTE-device.

Specifically, the LNA load of the added RX chain is optimized to comprise a wideband load, thereby simplifying the RX chain. Any of the inputs can be connected to the wideband load ($Z_{L,WB}$). For example, in the illustrated example, the carrier signals $RX_{LB,0}$, $RX_{HB,0}$, and $RX_{HB,1}$ are connected to LB, HB, and WB load resonators, respectively.

Accordingly, the connection portion is operable to guide a carrier signal of one carrier and a carrier signal of another carrier to one receive branch, and to guide one of another carrier signal of the one carrier and another carrier signal of the another carrier to another receive branch, the mixing portion comprises a local oscillator for each of the receive branches, and the one receive branch comprises a low-band amplifier load structure for low-band carriers and a high-band amplifier load structure for high-band carriers, and the another receive branch comprises a wide-band amplifier load structure for low-band and high-band carriers.

Figure 11:
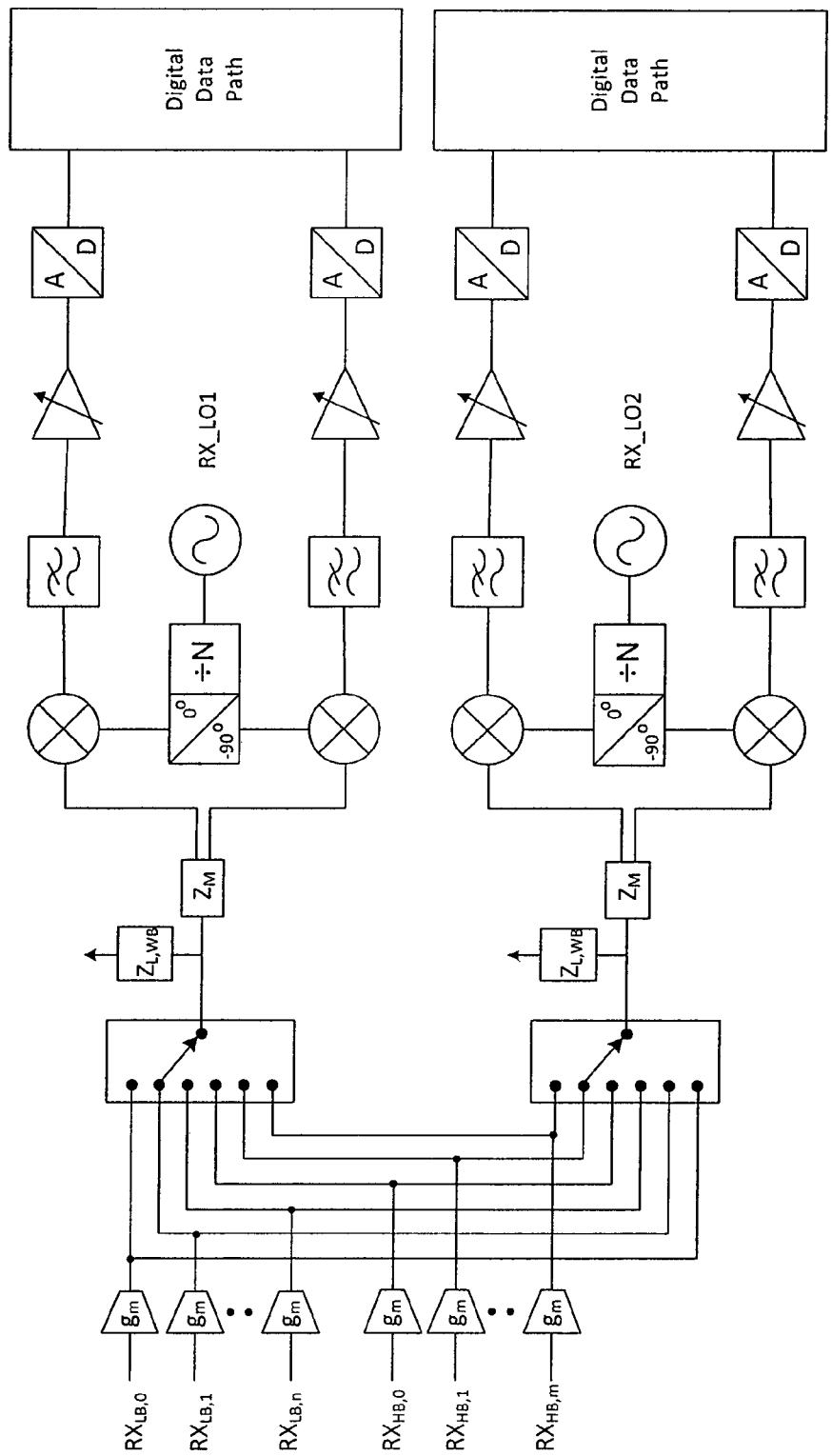
FIG. 11 shows a schematic block diagram of a third topology of a receiver with a receiver circuit for concurrent dual-carrier reception according to embodiments of the present invention.

FIG. 11 shows a schematic block diagram of a third topology of a receiver with a receiver circuit for concurrent dual-carrier reception according to embodiments of the present invention.

As shown in FIG. 11, there are n and m LNA input stages which are dedicated to support (carriers of) low-bands (LB) and (carriers of) high-bands (HB), respectively. n LB LNA input stages and m HB LNA input stages are connected to respective inputs. Two full RX chains are present. Namely, replacing the receiver hardware as presented in FIG. 6, a wide-band LNA load ($Z_{L,WB}$) and an LO signal generator (RX_LO1) are provided (in the upper part of FIG. 11). Further, in addition thereto, an additional wide-band LNA load ($Z_{L,WB}$) and an additional LO signal generator (RX_LO2) are added (in the lower part of FIG. 11). Meanwhile, the LNA input stages are shared between different RX chains, i.e. the number of LNA input stages is not increased compared to a legacy 2G/3G/LTE-device. That is, there are provided only two wide-band loads in total, thereby further minimizing the number of LNA loads.

Accordingly, the connection portion is operable to guide one of a carrier signal of one carrier and a carrier signal of another carrier to one receive branch, and to guide one of another carrier signal of the one carrier and another carrier signal of the another carrier to another receive branch, the mixing portion comprises a local oscillator for each of the receive branches, and each receive branch comprises a wide-band amplifier load structure for low-band and high-band carriers.

In layout design, the realization of the receiver circuit according to FIG. 11 could be cumbersome due to long interconnections between different inputs and loads. Therefore, the LNAs could suffer from additional layout parasitic components and possibly would be more prone to disturbances coupling via magnetic and capacitive paths. Therefore, despite the advantage in the overall number of loads and the layout (area) of the realization shown in FIG. 11, the realization shown in FIG. 9 is likely to yield a better (or best) performance while the realization shown in FIG. 10 is likely to yield a better (or best) trade-off in terms of a performance/layout (area) characteristic. Further, the wideband design of the LNA will nominally be a trade-off between a quality factor and CMRR.

Referring to the receiver topologies according to FIGS. 10 and 11, the following is to be noted regarding the wide-band loads being utilized.

A wide-band load in the meaning of the present invention and its embodiments does not necessarily mean such a load structure which offers uniform impedance across a wide (or its entire) frequency range (like a shunt-peak load). This is because insertion gain over a wide frequency area is not a desired property in harmful environments, since an amplifier is able to provide gain also to unwanted frequency components. The need for sufficient selectivity is emphasized in multi-band (e.g. dual-band) receivers simultaneously operating at different frequency bands. Therefore, a narrow band load having a large tuning range is a more preferable and effective option for such a wide-band load.

Figure 12:
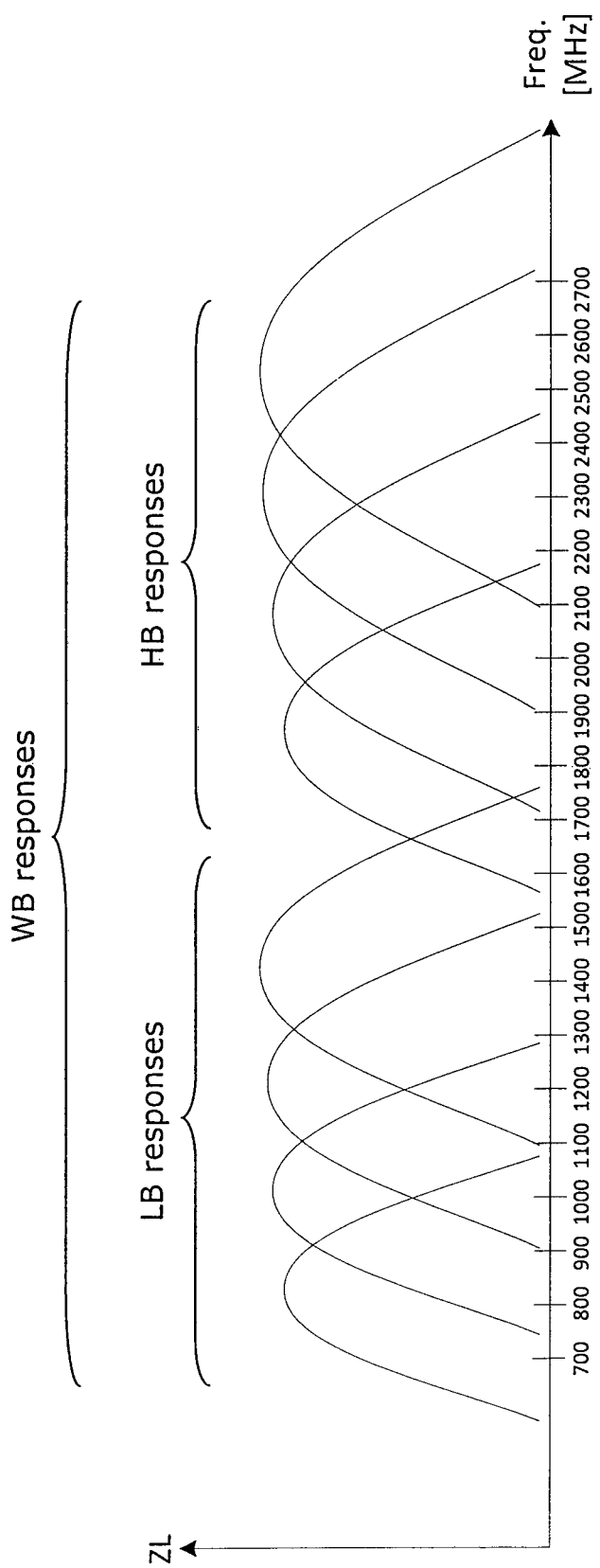
FIG. 12 shows a graph illustrating various frequency responses of a wide-tuning-range narrow-band adjustable load according to embodiments of the present invention.

FIG. 12 shows a graph illustrating various frequency responses of a wide-tuning-range narrow-band adjustable load according to embodiments of the present invention. In this example, LB and HB operation covers bands around the 700-1500 MHz and 1800-2700 MHz vicinities, respectively, and wide-band operation (of a tunable but selective load) covers both the frequency areas. This is evident from the illustration of LB, HB and WB responses.

Accordingly, a wide-band amplifier load structure according to embodiments of the present invention may comprise or be realized by a wide-tuning-range narrow-band adjustable load. Such wide-tuning-range narrow-band adjustable load could for example exhibit a frequency response adjustability as illustrated by FIG. 12. The final response may correspond to the maximum impedance in the frequency domain.

According to embodiments of the present invention, the wide-tuning-range narrow-band adjustable load may comprise or be realized by an LC resonator with variable inductance and capacitance values.

In such a switchable LC resonator, both the inductance and capacitance values may be tunable. Fine frequency tuning may be achieved with a stepwise capacitance change such as a 2-bit (4 setups) capacitance bank, and a coarse frequency tuning (i.e. a larger frequency step) may be realized by altering the inductance value. As shown in FIG. 12, at lower frequencies, the absolute bandwidth of the resonator is narrower than at higher frequencies, but the relative bandwidth is the same. In addition, the resonator impedance decreases when the center frequency of the resonator is lowered by increasing the capacitance value but can be stabilized by increasing the inductance value.

According to embodiments of the present invention, the wide-tuning-range narrow-band adjustable load may comprise or be realized by a tapped inductor with a variable short-circuiting part.

By using such a tapped inductor, the layout area may be optimized. In such a tapped inductor, the inductance value can be altered by short-circuiting part of the loops in integrated coil. Then, the area of the coil is limited by the value of the larger inductance value. Typically, a tapped-inductor load has slightly degraded Q-value and, most importantly, the tapped inductor has less rejection against common-mode signals. Yet, common-mode rejection capability in a LNA load resonator is a crucial factor in decreasing out-of-band signals—most importantly the leakage of a TX's own signal in FDD mode. Due to finite rejection/filtering capability in a filter module, part of the strong interferers and blockers pass the FEM and are sensed by the LNA input stage and are then transformed into current-mode signals. However, a significant part of the interfering signal at the LNA input enters in common-mode, and the LNA load resonator utilizing a differential coil easily has a 20 dB smaller impedance for common-mode signal components compared to differential ones. As a result, common-mode signals are attenuated prior to the mixing portion, thus mitigating the desensitization in down-conversion stage due to self-mixing, for example.

Hereinafter, additional topologies are presented with reference to FIGS. 13 and 14, which are based on the topology according to FIG. 10. While such configurations are effective, since the topology according to FIG. 10 is likely to yield the best performance/layout area characteristic, the topologies according to FIGS. 13 and 14 could equally be based on the topology according to any of FIGS. 9 and 11, respectively.

Figure 13:
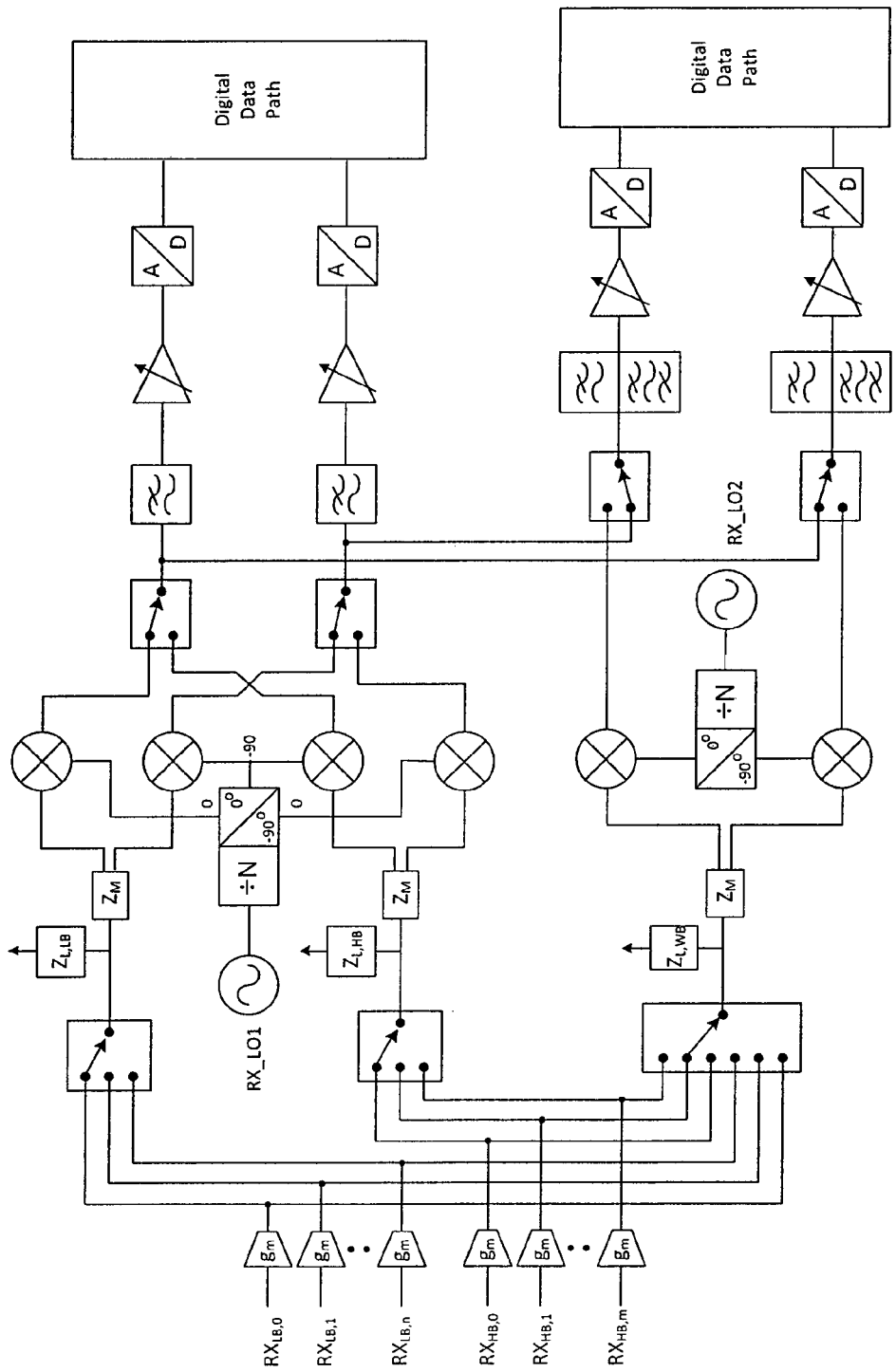
FIG. 13 shows a schematic block diagram of a fourth topology of a receiver with a receiver circuit for concurrent dual-carrier reception according to embodiments of the present invention.

FIG. 13 shows a schematic block diagram of a fourth topology of a receiver with a receiver circuit for concurrent dual-carrier reception according to embodiments of the present invention.

As shown in FIG. 13, an alternative signal path between the two receiver branches is added, and an adaptive low-pass/band-pass (analog channel) filter is used in the "additional" receive branch. To choose between the two available signals, a switch is provided in the "additional" receive branch.

Thereby, contiguous intra-band multi-carrier signals such as intra-band CA CCs can be supported with a single active LO frequency. The LO frequency is selected such that the "upper" RX branch in FIG. 13 is operable as a normal DCR and the additional "lower" receive branch in FIG. 13 is operable in low-IF mode. Both the (analog) filters, i.e. the adaptive low-pass/band-pass (analog channel) filter, and the ADC in the low-IF branch have to be either of pass-band type or could be designed to operate with a wide reception bandwidth setup. The analog pass-band filters and ADCs in the low-IF branch may also comprise a complex band-pass scheme providing lower I/Q imbalance. Both receive branches can utilize a gain control of their own. Then, the signal levels can be independently set to optimum levels in both receive branches, and maximum SNR and optimum ADC input levels can be achieved. As an advantage, two closely operating LO signals are avoided and the hybrid direct-conversion/low-IF receiver topology can tolerate large signal strength difference between the received carriers.

Accordingly, as compared with the receiver topology according to any of FIGS. 9 to 11, the receiver circuit further comprises a signal path between the one receive branch and the another receive branch between the selection portion and the output portion of the receive branches, which is operable to additionally guide the selected mixed carrier signal of the one receive branch to the another receive branch. Further, the output portion of the another receive branch comprises a switch operable to choose between the selected mixed carrier signal of the one receive branch and the selected mixed carrier signal of the another receive branch to be output, and an adaptive filter operable to filter adaptively the chosen mixed carrier signal by band-pass filtering or low-pass filtering.

Figure 14:
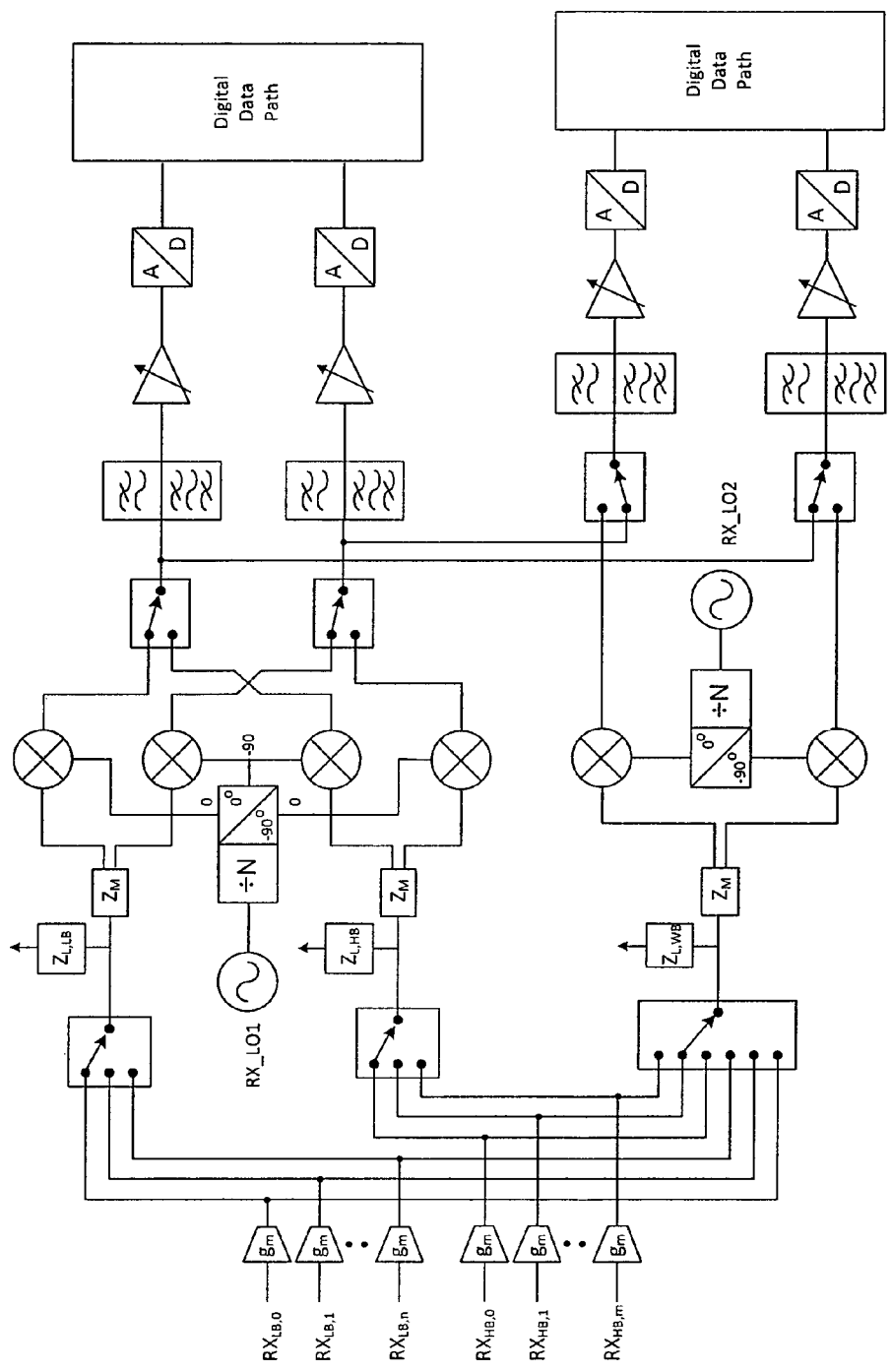
FIG. 14 shows a schematic block diagram of a fifth topology of a receiver with a receiver circuit for concurrent dual-carrier reception according to embodiments of the present invention.

FIG. 14 shows a schematic block diagram of a fifth topology of a receiver with a receiver circuit for concurrent dual-carrier reception according to embodiments of the present invention.

As shown in FIG. 14, as compared with the receiver topology according to FIG. 13, an adaptive low-pass/band-pass (analog channel) filter is additionally used in the "main" receive branch as well.

Thereby, non-contiguous intra-band multi-carrier signals such as intra-band CA CCs could be supported with a single active LO frequency. The LO frequency selection and RX filter configuration may be configured accordingly, respectively.

Accordingly, as compared with the receiver topology according to FIG. 13, the receiver circuit further comprises, in the output portion of the one receive branch, an adaptive filter operable to filter adaptively the selected mixed carrier signal of the one receive branch by band-pass filtering or low-pass filtering.

As evident from the above, in the receiver topologies according to FIGS. 13 and 14, additional hardware has been added. Thus, hardware complexity is increased as compared with a legacy Rel-8 DCR. For example, the ADC targeted to max 20-MHz LTE reception (i.e. 10-MHz IF channel) limits its usage in the low-IF branch. However, the analog and mixed-signal blocks in the low-IF operation could benefit from the fact that/when only LTE/HSDPA modes need to be supported. For example, since the analog filter block in the low-IF path does in such a case not need to cover the narrowest modes (such as GSM), the needed 3-dB pole frequencies are in the order of several MHz resulting in reasonable silicon area. In addition, ADC topology, which is optimized for wide bandwidths, can be chosen.

In the following, various control/controller-related aspects according to embodiments of the present invention are described.

As indicated above, a receiver circuit according to embodiments of the present invention may comprise a controller portion which is operable to control at least one of the connection portion and the selection portion. Thereby, the controller portion may determine a receiver chain from the input portion to the output portion, which may for example be accomplished on the basis of at least one of received signal strength of carrier signals of multiple carriers, activity of a transmitter circuit, and interference properties of the multiple carriers. Thereby, an optimal receiver chain may be chosen based on the information of received signal strength of different carriers, activity of transmitter, and potential interference cases with non-cellular RATs (e.g. 2.4-GHz WLAN).

Firstly, reference is made to carrier selection and the effect of an active UL transmission, i.e. an active transmitter.

For example, dual-band HSDPA or inter-band CA is only supported in DL in 3GPP Rel-10, i.e. there are no RF requirements specified for a dual-band uplink operation. Therefore, only either one of the FDD links of specified band combinations mentioned above has an active UL at a time. In view thereof, there are several options as to how to select an optimum receiver chain when the active UL and its output power are known and the strength of the own received signal is estimated.

In LB/HB and HB/LB cases, in which DL and UL operations reside on different bands, both RX signal paths have sufficient rejection against the active UL. This is because, in low-band or high-band configurations, RF filters before the RFIC typically comprise both duplexers and diplexers in the signal path.

In LB/LB and HB/HB cases, in which DL and UL operations reside on the same band, the FEM typically comprise two duplexers or a quadplexer to combine two rather closely operating bands. In "normal" single-band duplexers, where UL and DL operating bands are located quite close to each other in the frequency domain, filter vendors usually implement a notch around the UL frequency to improve the TX-to-RX isolation.

Figure 15:
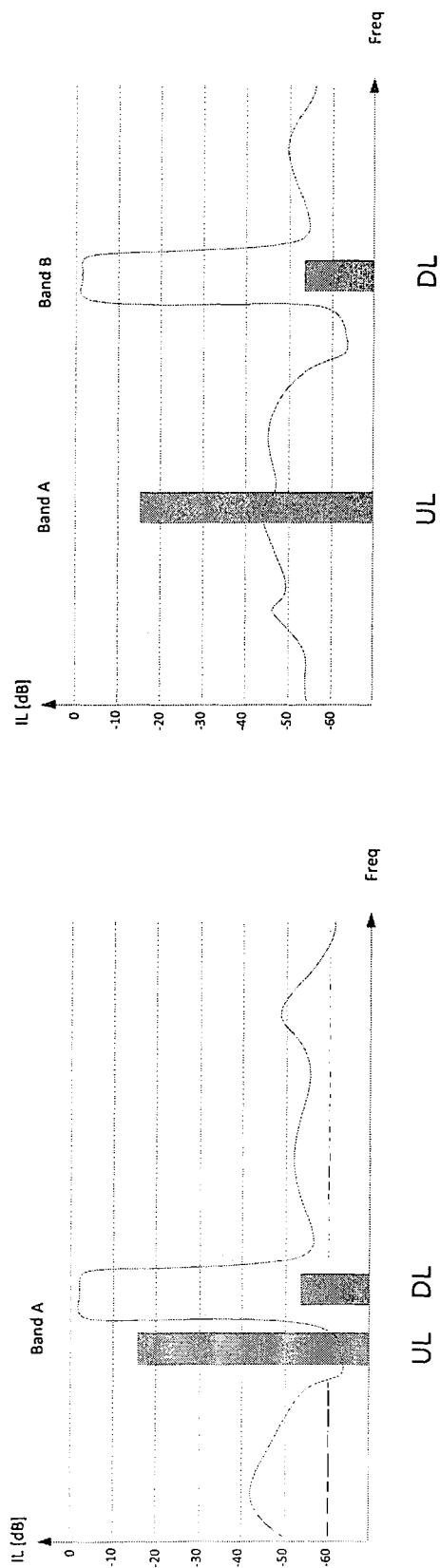
FIG. 15 shows graphs illustrating filter responses of RF FEM for different bands in a multi-band multi-carrier scenario, for which embodiments of the present invention are applicable.

FIG. 15 shows graphs illustrating filter responses of RF FEM for different bands in a multi-band multi-carrier scenario, for which embodiments of the present invention are applicable. In FIG. 15, RF filter responses are shown for DL paths on bands A and B, wherein UL is allocated for band A only.

In the left part of FIG. 15, a notch is implemented in the filter at the UL's own operating frequency so that the TX component is greatly suppressed at the LNA port (by over 50 dB or so). But, as seen in filter vendors' materials, the UL-to-DL isolation is typically worse at wider "virtual" duplex distances. Then, as presented in the right part of FIG. 15, the Band A UL component causes an actually worse situation at the LNA port of Band B. Furthermore, since filter terminals might not be optimally terminated across the whole frequency range of the two bands, the filter performance can be degraded and wide-duplex gap TX leakage can be increased. Every added 1 dB TX leakage at the LNA input means a 2 dB more stringent IIP2 requirement. Also, TX noise level at RX input starts to increase, thus desensitizing the RX further.

The issue relating to wide-duplex gap and associated TX leakage is described in more detail below with reference to FIG. 16.

Figure 16:
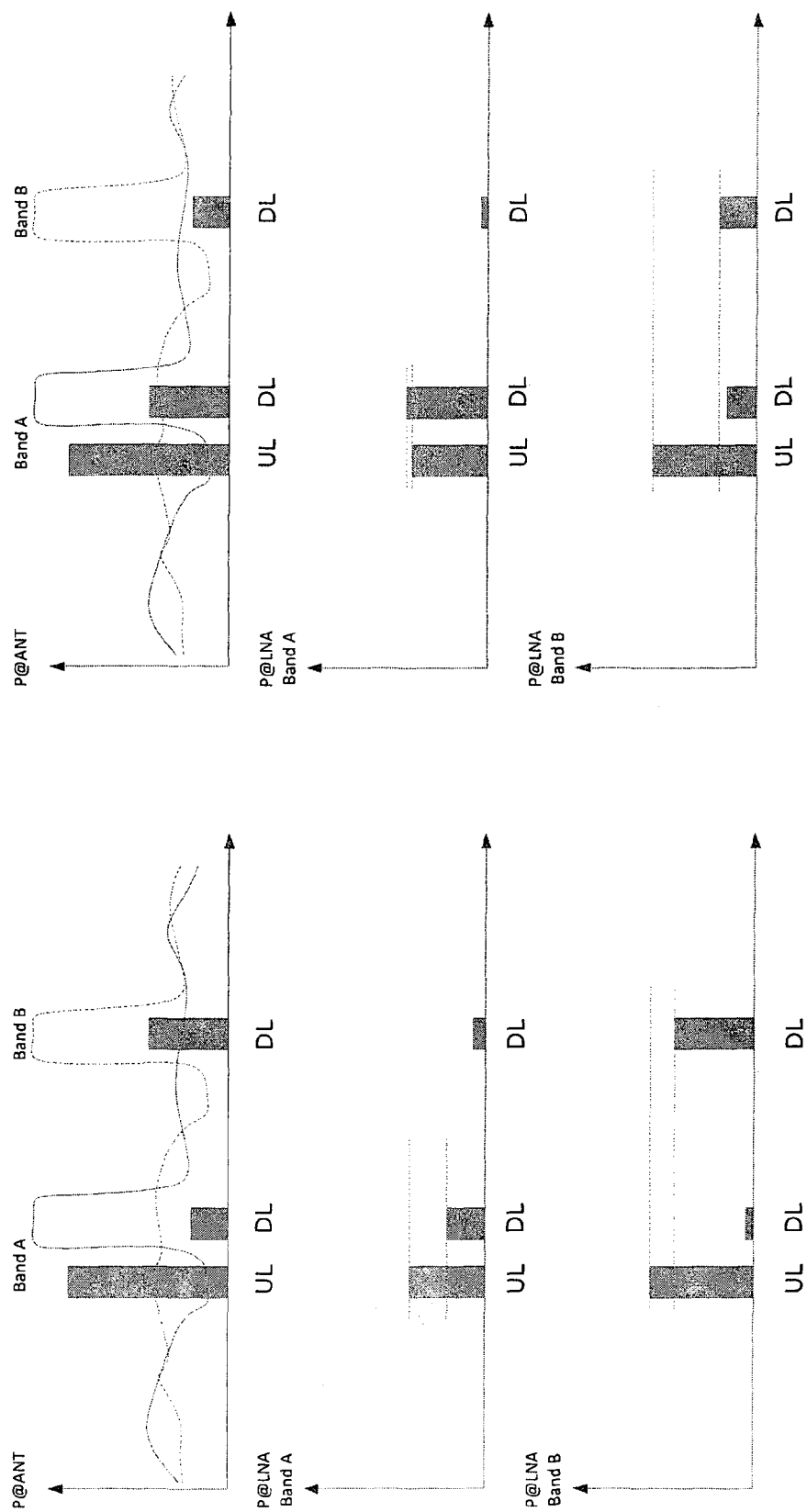
FIG. 16 shows graphs illustrating filter characteristics and possible signal levels for different bands in a multi-band dual-carrier scenario, for which embodiments of the present invention are applicable.

FIG. 16 shows graphs illustrating filter characteristics and possible signal levels for different bands in a multi-band dual-carrier scenario, for which embodiments of the present invention are applicable. In FIG. 16, as in FIG. 15, it is assumed that Band A includes both UL and DL components and Band B includes a DL component only.

The upper graphs illustrate the filter responses and the signal strengths. The filter response for Band A is indicated by a solid line, and the filter response for Band B is indicated by a dashed line, respectively. In the case depicted on the left part of FIG. 16, the received (DL) signal component at Band B is stronger than that of Band A, while in the case depicted on the right part of FIG. 16, the received (DL) signal component at Band B is weaker than that of Band A.

The lower graphs illustrate the received signal strength and TX leakage at ports of Band A and Band B taking into account the different TX-RX isolation at corresponding ports. As is seen on the left part, albeit the isolation against wider TX components is poorer, the received wanted signal strength in both RX ports (for Bands A and B) compared to leaked TX component is still sufficient. As is seen on the right part, the received signal strength level in port B compared to TX leakage becomes more challenging. Therefore, if the additional RX chain comprises a wide-tuning range load it can have less rejection against TX leakage, as discussed earlier. Therefore, it is beneficial to receive the component carrier, which is expected to have a stronger TX leakage at LNA input, with a RF chain with improved selectivity, blocking immunity, and/or spurious response rejection. Such improved RF chain could also be featured by a narrower load. In this regard, any anti-blocking mechanism providing for an adequate TX suppression is generally applicable. In addition, the decision can be based on received signal strength information.

Accordingly, a controller portion according to embodiments of the present invention may be operable to determine, for a carrier which is expected to have a stronger transmit leakage at an amplifier input stage, a receiver chain with a narrower load of the amplifier load structure in the receive branch.

Secondly, reference is made to carrier selection and the effect of interference, especially the effect of $3^{rd}$ order harmonics (H3). It is noted that, while H3 is mainly referred to due to it being a relevant interference component, the principles set out below are equally applicable to any interference or interference component. Any mixer in a mixing portion in any receiver circuit described herein converts signals from the LO frequency and its harmonics. Typically, a mixer uses a double-balanced structure, and therefore the level of even-order harmonics at the mixer output is very low. However, odd-order harmonics of the LO frequency are not rejected. In modern CMOS processes implementing passive mixer topologies, these require rail-to-rail clocking waveforms with very high harmonic content. The biggest problem in terms of interference is the conversion from $3^{rd}$ harmonics to the baseband. The down-converted blocker signal from $3^{rd}$ harmonics can degrade the signal-to-noise-ratio of the desired signal or block the reception altogether via compression or intermodulation. For example, cellular radio operating around the 800 MHz range (e.g. Band 20, DL: 791-821MHz) can down-convert a signal from the 2.4-GHz frequency area where other radios, e.g. WLAN, operate. Additionally, DLs operating around the 1700-1900 MHz range (e.g. Bands 3 and 9) can be corrupted by a down-converted 5-GHz WLAN signal. Therefore, in CA cases where bands B3 or B20 are being aggregated with a 2.4-GHz carrier (wherein it is noted that such combination is currently not specified), it would be beneficial to utilize a receiver chain having better performance of input spurious rejection of $3^{rd}$ harmonics (ISR3).

Figure 17:
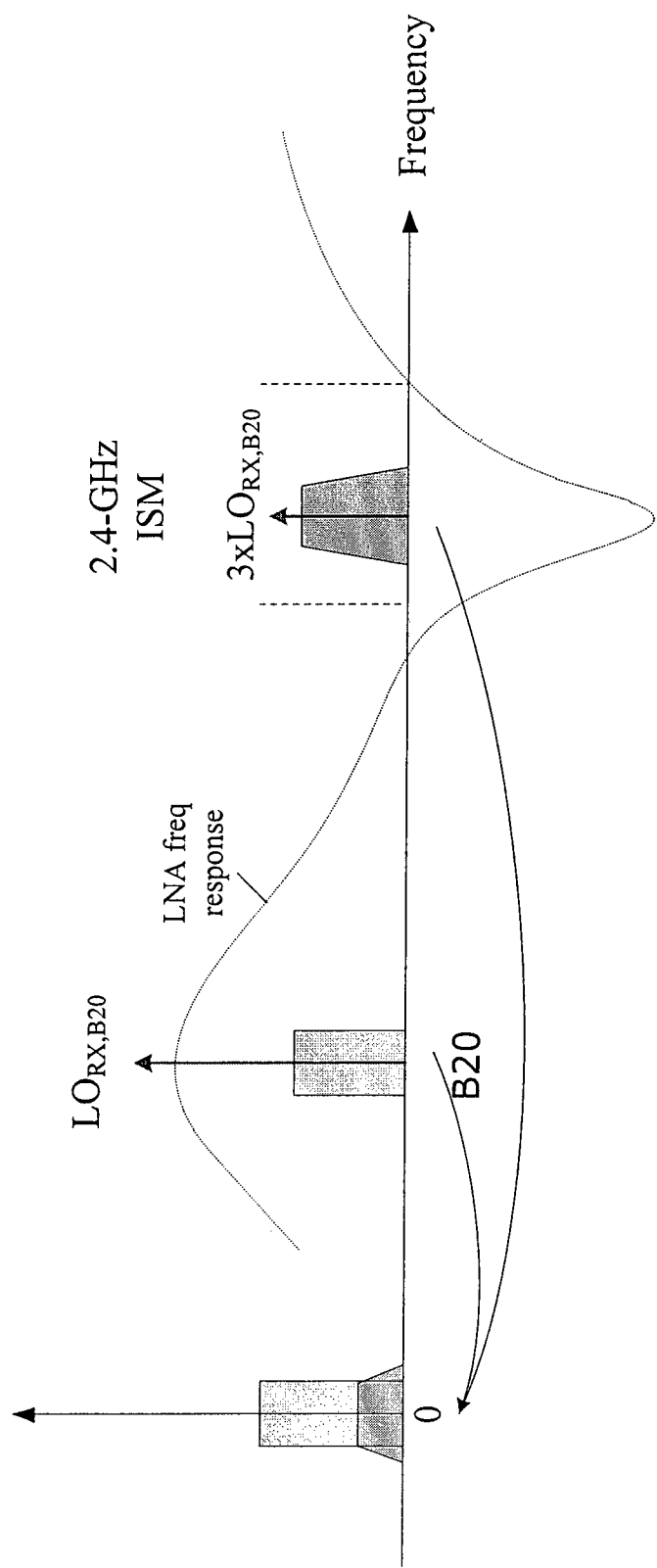
FIG. 17 shows a graph illustrating desensitization due to down-conversion at the third order harmonic in a multi-band single-carrier scenario, for which embodiments of the present invention are applicable.

FIG. 17 shows a graph illustrating desensitization due to down-conversion at the third order harmonic in a multi-band single-carrier scenario, for which embodiments of the present invention are applicable. As shown in the case of FIG. 17, desensitization in accordance with the LNA frequency response results from down-conversion (indicated by the solid lines) of the B20 DL carrier signal and the 2.4-GHz DL carrier signal with the LO frequency being used by the mixer handling the B20 DL carrier signal. An LC resonator may be used which has high impedance at the wanted frequency but can simultaneously attenuate an unwanted signal at the $3^{rd}$ harmonics frequency. However, implementing a good H3 trap with a wide-tuning-range (narrow-band adjustable) resonator or load can be challenging. Therefore, it can be beneficial to receive Band B3 or Band B20 with a receiver chain comprising a narrow-band resonator or load with a H3 trap.

Accordingly, a controller portion according to embodiments of the present invention may be operable to determine, for a carrier which is expected to cause interference of a mixed carrier signal with another mixed carrier signal of another carrier, a receiver chain with better interference performance and/or a narrow-band resonator with an interference trap as the amplifier load structure in the receive branch. In view of the above, embodiments of the present invention provide a receiver circuit for concurrent reception of multiple carriers and a receiver using the same, which are capable of (concurrently) receiving multiple carriers in a multi-band single- or multi-carrier scenario on the basis of a DCR-type topology. The above-outlined topologies for concurrent single- or multi-carrier reception are also operable for inter-RAT reception, and are realizable in a single RFIC and/or die, which is specifically beneficial from a technological point of view.

A receiver circuit and a receiver using the same according to embodiments of the present invention are applicable to any carrier/band combinations. Accordingly, embodiments of the present invention are applicable for any recent or future radio system in a single- or multi-carrier transmission scenario, for which a concurrent reception of one or multiple carriers is desirable, such as e.g. for UEs of Release 10 and beyond. Thereby, a radio receiver is presented, which is capable of receiving, for example, dual-band HSDPA and LTE inter-band carrier aggregation (CA) component carriers.

In general terms, the respective devices/apparatuses (and/or portions thereof) may represent means for performing respective operations and/or exhibiting respective functionalities, and/or the respective devices/apparatuses (and/or portions thereof) may have functions for performing respective operations and/or exhibiting respective functionalities.

It is noted that embodiments of the present invention are not limited to such topologies as depicted in FIGS. 8 to 11, 13 and 14, but any configuration capable of realizing the structural and/or functional features described herein is equally applicable.

In general, it is to be noted that respective functional blocks or elements according to above-described aspects can be implemented by any known means, either in hardware and/or software/firmware, respectively, if it is only adapted to perform the described functions of the respective parts.

Generally, any structural means such as a portion or other circuitry of a receiver circuit may refer to one or more of the following: (a) hardware-only circuit implementations (such as implementations in only analog and/or digital circuitry) and (b) combinations of circuits and software (and/or firmware), such as (as applicable):

(i) a combination of processor(s) or (ii) portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. Also, it may also cover an implementation of merely a processor (or multiple processors) or portion of a processor and its (or their) accompanying software and/or firmware, any integrated circuit, or the like.

Generally, any procedural step or functionality is suitable to be implemented as software/firmware or by hardware without changing the ideas of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independent of each other but in a same device housing, for example.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Apparatuses and/or means or portions thereof can be implemented as individual devices, but this does not exclude that they may be implemented in a distributed fashion throughout the system, as long as the functionality of the device is preserved. Such and similar principles are to be considered as known to a skilled person.

The present invention also covers any conceivable combination of functional and structural features described above, and any conceivable combination of nodes, apparatuses, modules or elements described above, as long as the above-described concepts of functional and structural configuration are applicable.

By virtue of embodiments of the present invention, there are provided a receiver circuit for concurrent reception of multiple carriers and a receiver using the same. The receiver circuit comprises a connection portion for guiding each one of a first predefined number of carrier signals of multiple carriers to one of the first predefined number of receive branches, each receive branch comprising a least one amplifier load structure, a mixing portion for generating a second predefined number of mixed carrier signals on each receive branch by mixing a carrier signal on each one of said receive branches with a second predefined number of local oscillator frequencies, and a selection portion for selecting one of the second predefined number of mixed carrier signals on each receive branch to be output via the first predetermined number of output paths to a digital data path.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

LIST OF ACRONYMS AND ABBREVIATIONS

3GPP Third Generation Partnership Project
ADC Analog-to-Digital Converter
AMP Amplifier
ANT Antenna
BW Bandwidth
CA Carrier Aggregation
CC Component Carrier
CMOS Complementary Metal-to-Oxide Semiconductor
CMRR Common-Mode Rejection Ratio
DC-HSDPA Dual-Carrier High Speed Downlink Packet Access
DCR Direct-Conversion Receiver
DL Downlink
eNB evolved NodeB
FDD Frequency Division Duplex
FEM Front-End Module
GPS Global Positioning System
GSM Global System for Mobile Communications
HB High-Band
HSDPA High Speed Downlink Packet Access
HSPA High Speed Packet Access
HW Hardware
IC Integrated Circuit
IF Intermediate Frequency
IIPx x-th order Input Intercept Point
IL Insertion Loss
IQ In-phase and Quadrature Phase
ISM Industrial Scientific Medical (band)
ISR Input Spurious Rejection
LB Low-Band
LNA Low-Noise Amplifier
LO Local Oscillator
LPF Low-Pass Filter
LTE Long Term Evolution
MB Middle-Band or Medium-Band
MIX Mixer
MIMO Multiple-Input Multiple-Output
MUX Multiplexer
NC Non-contiguous
NC-HSDPA Non-Contiguous High Speed Downlink Packet Access
P Power
PLL Phase-Locked Loop
PSD Power Spectral Density
PWB Printed Wiring Board
RAT Radio Access Technology
RF Radio Frequency
RFIC Radio Frequency Integrated Circuit
RX Receive/Receiver
SNR Signal-to-Noise Ratio
SW Switch
TX Transmit/Transmitter
UE User Equipment
UL Uplink
WB Wide-Band
WCDMA Wideband Code Division Multiple Access
WLAN Wireless Local Area Network

The invention claimed is:

1. A receiver circuit at a terminal in a communication system, the receiver circuit comprising:
an input portion configured to input a plurality of carrier signals of multiple carriers via a plurality of amplifier input stages;
a connection portion configured to guide each one of a first predefined number of carrier signals in the plurality of carrier signals to one of a number of receive branches, each of the receive branches comprising at least one amplifier load structure, the number of the receive branches being equal to the first predefined number;
a mixing portion configured to generate a second predefined number of mixed carrier signals on each of the receive branches by mixing one of the carrier signals on each one of said receive branches with a number of local oscillator frequencies equal to the second predefined number, wherein at least two of the local oscillator frequencies are different from each other;
a selection portion configured to select one of the second predefined number of the mixed carrier signals on each of the receive branches; and
an output portion configured to output a number of the selected mixed carrier signals on the receive branches via a number of output paths to a digital data path, the number of the selected mixed carried signals being equal to the first predetermined number, and the number of the output paths being equal to the first predetermined number.

2. A receiver circuit according to claim 1, wherein the input portion comprises a number of input groups equal to the first predefined number, each of the input groups comprising one or more of the amplifier input stages configured to input the carrier signals of a specific carrier.

3. A receiver circuit according to claim 1, wherein the connection portion comprises a multiplexer configured to electrically connect each one of the first predefined number of the amplifier input stages with one of the first predefined number of receive branches.

4. A receiver circuit according to claim 1, wherein the mixing portion comprises:
   a number of mixer banks equal to the first predefined number, each of the mixer banks comprising a number of mixers equal to the second predefined number, each of the mixers being configured to mix one of the carrier signals with one of the second predefined number of the local oscillator frequencies, and
   a number of local oscillators equal to the second predefined number, each of the local oscillators being configured to generate one of the second predefined number of the local oscillator frequencies,
   wherein each local oscillator is connectable with one of the mixers in each of the mixer banks.

5. A receiver circuit according to claim 4, wherein the selection portion comprises a multiplexer configured to electrically connect one of the mixers in each of the mixer banks with one of the first predefined number of the output paths.

6. A receiver circuit according to claim 1, wherein:
   the connection portion is configured to guide a first carrier signal of the multiple carriers and a second carrier signal of the multiple carriers to two of the receive branches,
   the mixing portion comprises a local oscillator for each of the receive branches, and
   each of the receive branches comprises a low-band amplifier load structure for low-band carriers and a high-band amplifier load structure for high-band carriers.

7. A receiver circuit according to claim 1, wherein:
   the connection portion is configured to guide a first carrier signal and a second carrier signal of the multiple carriers to two of the receive branches,
   the mixing portion comprises a local oscillator for each of the receive branches, and
   one of the two receive branches comprises a low-band amplifier load structure for low-band carriers and a high-band amplifier load structure for high-band carriers, and another receive branch of the two receive branches comprises a wide-band amplifier load structure for low-band and high-band carriers.

8. A receiver circuit according to claim 1, wherein:
   the connection portion is configured to guide a first carrier signal and a second carrier signal of the multiple carriers to two of the receive branches,
   the mixing portion comprises a local oscillator for each of the receive branches, and each of the two receive branches comprises a wide-band amplifier load structure for low-band and high-band carriers.

9. A receiver circuit according to claim 8, wherein each of the wide-band amplifier load structures comprises a wide-tuning-range narrow-band adjustable load.

10. A receiver circuit according to claim 9, wherein each of the wide-tuning-range narrow-band adjustable loads comprises an LC resonator with variable inductance and capacitance values or a tapped inductor with a variable short-circuiting part.

11. A receiver circuit according to claim 6, further comprising a signal path between one of the two receive branches and a second of the two receive branches between the selection portion and the output portion of the receive branches, which is configured to additionally guide the selected mixed carrier signal of the one receive branch to the second receive branch, wherein the output portion of the second receive branch comprises:
    a switch configured to choose between the selected mixed carrier signal of the one receive branch and the selected mixed carrier signal of the second receive branch for output, and
    an adaptive filter configured to filter adaptively the chosen mixed carrier signal by band-pass filtering or low-pass filtering.

12. A receiver circuit according to claim 11, wherein the output portion of the one receive branch comprises an adaptive filter configured to adaptively filter the selected mixed carrier signal of the one receive branch by band-pass filtering or low-pass filtering.

13. A receiver circuit according to claim 1, further comprising a controller portion configured to control at least one of the connection portion or the selection portion, in order to determine a receiver chain configuration from the input portion to the output portion on the basis of at least one of: received signal strength of the carrier signals of the multiple carriers, activity of a transmitter circuit, or interference properties of the multiple carriers.

14. A receiver circuit according to claim 13, wherein the controller portion is configured to determine, for a particular carrier of the multiple carriers which is expected to have a stronger transmit leakage at an amplifier input stage than at least one other carrier of the multiple carriers, the receiver chain configuration having at least one of: improved selectivity, blocking immunity, or spurious response rejection.

15. A receiver circuit according to claim 13, wherein the controller portion is configured to determine, for a particular carrier of the multiple carriers which is expected to cause interference in the mixing portion, the receiver chain configuration having better interference performance and/or a narrow-band resonator with an interference trap as the amplifier load structure in the receive branch of the receiver chain configuration.

16. A receiver circuit according to claim 1, wherein:
    the multiple carriers comprise different frequency carriers in a single frequency band or multiple frequency bands, and
    the different frequency carriers comprise carriers in at least one of a cellular communication system, positioning radio systems, connectivity radio systems, and systems with different radio access technologies.

17. A receiver circuit according to claim 1, wherein:
    the receiver circuit is embodied in a radio frequency integrated circuit, or
    the receiver circuit constitutes a direct conversion receiver.

18. A receiver at a terminal in a communication system, comprising at least two receiver circuits, each of the receiver circuits being according to claim 1.

19. The receiver according to claim 18, wherein:
    the receiver comprises a diversity receiver, or
    at least one of the receiver circuits constitutes a main receiver part and at least one other of the receiver circuits constitutes a diversity receiver part.

20. A method of operating a receiver circuit at a terminal in a communication system, the method comprising:
- inputting a plurality of carrier signals of multiple carriers via a plurality of amplifier input stages;
- guiding each one of a first predefined number of carrier signals in the plurality of carrier signals to one of a number of receive branches, each of the receive branches comprising at least one amplifier load structure, and the number of the receive branches being equal to the first predefined number;
- generating a second predefined number of mixed carrier signals on each of the receive branches by mixing one of the carrier signals on each one of the receive branches with a number of local oscillator frequencies equal to the second predefined number, wherein at least two of the local oscillator frequencies are different from each other;
- selecting one of the second predefined number of the mixed carrier signals on each of the receive branches; and
- outputting a number of the selected mixed carrier signals on the receive branches via a number of output paths to a digital data path, the number of the selected mixed carried signals being equal to the first predetermined number, and the number of the output paths being equal to the first predetermined number.

* * * * *